(12) United States Patent
Nakagawa et al.

(10) Patent No.: US 10,495,450 B2
(45) Date of Patent: Dec. 3, 2019

(54) IMAGING SYSTEM, IMAGING DEVICE, METHOD OF IMAGING, AND STORAGE MEDIUM FOR IMAGING AN OBJECT USING AT LEAST ONE DETECTOR

(71) Applicant: NIKON CORPORATION, Tokyo (JP)

(72) Inventors: Yoshihiro Nakagawa, Tokyo (JP); Takeaki Sugimura, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 128 days.

(21) Appl. No.: 15/716,984

(22) Filed: Sep. 27, 2017

(65) Prior Publication Data

US 2018/0017379 A1    Jan. 18, 2018

Related U.S. Application Data

(63) Continuation of application No. PCT/JP2016/059906, filed on Mar. 28, 2016.

(30) Foreign Application Priority Data

Mar. 31, 2015    (JP) .................................. 2015-071439

(51) Int. Cl.
*G01B 11/24* (2006.01)
*H04N 5/232* (2006.01)
(Continued)

(52) U.S. Cl.
CPC ............ *G01B 11/24* (2013.01); *G06T 1/0007* (2013.01); *G06T 7/593* (2017.01); *G06T 7/62* (2017.01);
(Continued)

(58) Field of Classification Search
None
See application file for complete search history.

(56) References Cited

U.S. PATENT DOCUMENTS 6,664,531 B2 * 12/2003 Gartner ................ G01B 11/245
250/208.1
9,151,830 B2 * 10/2015 Bridges ................ G01C 15/002
(Continued)

FOREIGN PATENT DOCUMENTS

JP    2010-134546 A    6/2010

OTHER PUBLICATIONS

J. Wang, C. Zhang, W. Zhu, Z. Zhang, Z. Xiong and P. A. Chou, "3D scene reconstruction by multiple structured-light based commodity depth cameras," 2012 IEEE International Conference on Acoustics, Speech and Signal Processing (ICASSP), Kyoto, 2012, pp. 5429-5432. (Year: 2012).*

(Continued)

*Primary Examiner* — Andrae S Allison
(74) *Attorney, Agent, or Firm* — Oliff PLC

(57) ABSTRACT

An imaging system, including: a first body; a first detector that is provided in the first body and includes a first imager that images an object; a first information calculator that is provided in the first body and uses a detection result of the first detector to calculate at least one of shape information and texture information of the object; a second body that is arranged at a position separate from the first body and has identification information detected by the first imager; a second detector that is provided in the second body and includes a second imager that images the object; and a position acquirer that acquires position information including a positional relation between the first detector and the second detector based on the identification information detected by the first imager.

25 Claims, 24 Drawing Sheets

(51) Int. Cl.
  *G06T 7/62* (2017.01)
  *G06T 7/70* (2017.01)
  *G06T 1/00* (2006.01)
  *G06T 7/593* (2017.01)
(52) U.S. Cl.
  CPC .............. *G06T 7/70* (2017.01); *H04N 5/232* (2013.01); *G06T 2207/10012* (2013.01); *G06T 2207/30224* (2013.01)

(56) References Cited

U.S. PATENT DOCUMENTS

| | | | | |
|---|---|---|---|---|
| 9,967,545 | B2* | 5/2018 | Tohme | G01C 15/002 |
| 2010/0265316 | A1* | 10/2010 | Sali | H04N 13/254 |
| | | | | 348/46 |
| 2011/0025827 | A1* | 2/2011 | Shpunt | G01B 11/22 |
| | | | | 348/47 |
| 2011/0035952 | A1* | 2/2011 | Roithmeier | G01B 11/002 |
| | | | | 33/503 |
| 2011/0043620 | A1* | 2/2011 | Svanholm | G01C 1/04 |
| | | | | 348/135 |
| 2011/0052006 | A1* | 3/2011 | Gurman | G06K 9/00201 |
| | | | | 382/103 |
| 2015/0178900 | A1* | 6/2015 | Kim | G06T 5/50 |
| | | | | 382/154 |

OTHER PUBLICATIONS

Jun. 21, 2016 International Search Report issued in International Patent Application No. PCT/JP2016/059906.
Jun. 21, 2016 Written Opinion issued in International Patent Application No. PCT/JP2016/059906.

* cited by examiner

FIG. 14

| ID | DEVICE NAME | POSITION | ATTITUDE |
|---|---|---|---|
| 1 | FIRST IMAGING DEVICE | X=X1, Y=Y1, Z=Z1 | $\theta X=\alpha 1, \theta Y=\beta 1, \theta Z=\gamma 1$ |
| 2 | SECOND IMAGING DEVICE | X=X2, Y=Y2, Z=Z2 | $\theta X=\alpha 2, \theta Y=\beta 2, \theta Z=\gamma 2$ |
| ⋮ | ⋮ | ⋮ | ⋮ |
| n | NTH IMAGING DEVICE | X=Xn, Y=Yn, Z=Zn | $\theta X=\alpha n, \theta Y=\beta n, \theta Z=\gamma n$ |

IMAGING SYSTEM, IMAGING DEVICE, METHOD OF IMAGING, AND STORAGE MEDIUM FOR IMAGING AN OBJECT USING AT LEAST ONE DETECTOR

CROSS REFERENCE TO RELATED APPLICATION

This is a Continuation of PCT Application No. PCT/JP2016/059906, filed on Mar. 28, 2016. The contents of the above-mentioned application are incorporated herein by reference.

FIELD OF THE INVENTION

The present invention relates to an imaging system, an imaging device, a method of imaging, and a storage medium.

BACKGROUND

Developed is a technique that detects an object by a plurality of imaging devices and inputs a plurality of obtained images to a computer to acquire a three-dimensional shape of the object (for example, see Patent Literature 1).

[Patent Literature 1] Japanese Unexamined Patent Application Publication No. 2010-134546

When information indicating a positional relation between the imaging devices that detect the object is insufficient, it is difficult to associate a plurality of detection results obtained from the imaging devices with each other with high precision.

SUMMARY

A first aspect of the present invention provides an imaging system, including: a first body; a first detector that is provided in the first body and includes a first imager that images an object; a first information calculator that is provided in the first body and uses a detection result of the first detector to calculate at least one of shape information and texture information of the object; a second body that is arranged at a position separate from the first body and has identification information detected by the first imager; a second detector that is provided in the second body and includes a second imager that images the object; and a position acquirer that acquires position information including a positional relation between the first detector and the second detector based on the identification information detected by the first imager.

A second aspect of the present invention provides an imaging system including a first body; a first imager that is provided in the first body and images an object; a first information calculator that is provided in the first body and uses an imaging result of the first imager to calculate at least one of shape information and texture information of the object; a second body that is arranged within a field of view of the first imager and has a side face to be imaged by the first imager; a second imager that is provided in the second body and images the object; and a position acquirer that acquires position information including a positional relation between the first imager and the second imager based on a specific part on the side face imaged by the first imager.

A third aspect of the present invention provides an imaging device including: a first body; a first detector that is provided in the first body and includes a first imager that images an object; a first information calculator that is provided in the first body and uses a detection result of the first detector to calculate at least one of shape information and texture information of the object; and a position acquirer that uses a result obtained by detecting identification information of a second body arranged at a position separate from the first body by the first imager to acquire position information including a positional relation between the first detector and the second body.

A fourth aspect of the present invention provides a method of imaging including: imaging an object by a first imager provided in a first body; calculating, by using a detection result of a first detector including the first imager, at least one of shape information and texture information of the object; imaging the object by a second imager provided in a second body arranged at a position separate from the first body; detecting identification information of the second body using the first imager; and acquiring position information including a positional relation between a second detector including the second imager and the first detector based on the identification information detected by the first imager.

A fifth aspect of the present invention provides a storage medium storing therein a program that causes a computer to execute: imaging an object by a first detector that is provided in a first body and includes a first imager; calculating, by using a detection result of the first detector, at least one of shape information and texture information of the object by a first information calculator provided in the first body; and acquiring, by using a result obtained by detecting identification information of a second body arranged at a position separate from the first body by the first imager, position information including a positional relation between the first detector and the second body.

A sixth aspect of the present invention provides a storage medium storing therein a program that causes a computer to execute: imaging an object by a first imager provided in a first body; calculating, by using an imaging result of the first imager, at least one of shape information and texture information of the object by a first information calculator provided in the first body; imaging the object by a second imager that is arranged within a field of view of the first imager and is provided in a second body having a side face to be imaged by the first imager; and acquiring position information including a positional relation between the first imager and the second imager based on a specific part on the side face imaged by the first imager.

BRIEF DESCRIPTION OF DRAWINGS

FIG. 14 is a diagram illustrating an example of a data structure of a database according to the third embodiment.

DETAILED DESCRIPTION OF EMBODIMENTS

First Embodiment

Figure 1:
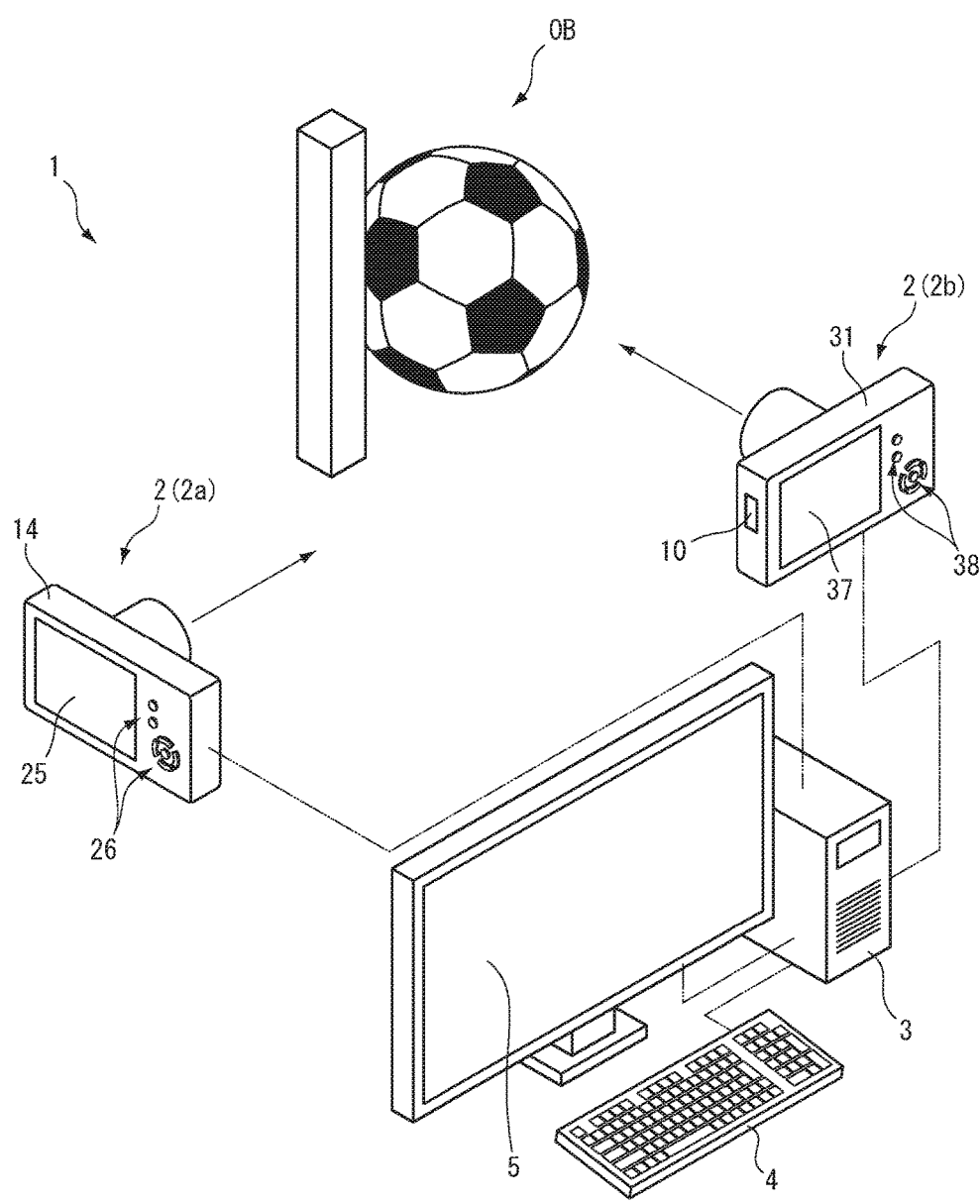
FIG. 1 is a diagram illustrating an imaging system according to a first embodiment.

A first embodiment is now described. FIG. 1 is a diagram illustrating an imaging system 1 according to the first embodiment. For example, the imaging system 1 includes a plurality of imaging devices 2, an information processing device 3, an input device 4, and a display device 5. For example, the imaging devices 2 include a first imaging device 2a and a second imaging device 2b.

The first imaging device 2a images, for example, an object OB illuminated with light from an illumination device, light from an interior lamp, or natural light to acquire data on a taken image (for example, visible light image or infrared light image) of the object OB. The first imaging device 2a detects a distance from the first imaging device 2a to each point on the surface of the object OB to acquire depth information on the object OB. For example, the depth information includes information in which the position of a point on the surface of the object OB is associated with the distance (depth) from the point to the first imaging device 2a. Examples of the depth information include information indicating a distribution of the depths in an area including the object OB (for example, a depth map).

The first imaging device 2a uses the depth information to perform calculation processing on information about the object OB. The first imaging device 2a performs calculation processing to model at least a part of the object OB and calculate model information (model data). For example, the first imaging device 2a performs calculation processing to subject at least a part of the object OB to computer graphics processing (CG processing) and calculate model information (for example, CG model data). The model information includes, for example, at least one of shape information indicating a three-dimensional shape of the object OB and texture information indicating a pattern of the surface of the object OB. For another example, the model information includes at least one of three-dimensional point coordinates, information related to the point coordinates, texture information of a surface defined by the point coordinates and the related information, image spatial information such as illumination conditions for the entire image and light source information, and polygon data as shape information.

For example, the object OB in FIG. 1 includes a prismatic member and a soccer ball, and shape information thereof includes information on the surface of the prismatic member (for example, a plane) and information on the surface of the soccer ball (for example, a sphere). Texture information of the object OB includes, for example, at least one piece of information of a character, a figure (for example, a black pentagon or a white hexagon), a pattern, information defining unevenness, a particular image, and a color (for example, a chromatic color or an achromatic color) on the surface of the soccer ball.

For example, the first imaging device 2a calculates first model information on a part of the object OB that is within the field of view of the first imaging device 2a (a view field area, an area of field of view). Examples of this first model information include information on a model (hereinafter referred to as "first partial model") representing a part of a model representing the whole circumference of the object OB (hereinafter referred to as "whole circumference model"). For example, the whole circumference model is a model the surface of which is closed, whereas the first partial model is a model the surface of which is not closed. The first imaging device 2a is capable of supplying at least a part of information calculated through calculation processing (for example, the first model information) to an external device. For example, the first imaging device 2a supplies at least a part of the first model information to the information processing device 3.

The second imaging device 2b is arranged at a position different from that of the first imaging device 2a. The second imaging device 2b detects the object OB from a viewpoint different from that of the first imaging device 2a. For example, the second imaging device 2b acquires information for use in the calculation of model information outside the field of view of the first imaging device 2a. For example, the second imaging device 2b acquires data on a taken image (for example, a visible light image or an infrared light image) of the object OB. For example, the second imaging device 2b detects a distance from the second imaging device 2b to each point on the surface of the object OB to acquire depth information of an area including the object OB.

For example, the second imaging device 2b has the same configuration as the first imaging device 2a and calculates second model information on a part of the object OB that is within the field of view of the second imaging device 2b. The second model information is information on a partial model (hereinafter referred to as "second partial model") representing a part of the whole circumference model. At least a part of the second partial model does not overlap with the first partial model by the first imaging device 2a. The second partial model may overlap with a part of the first partial model or does not necessarily need to overlap with the first partial model. The second imaging device 2b is capable of supplying at least a part of information calculated through calculation processing (for example, the second model information) to an external device. For example, the second imaging device 2b supplies at least a part of the second model information to the information processing device 3.

The information processing device 3 includes, for example, a computer system. The information processing device 3 is communicably connected to the first imaging device 2a in a wired or wireless manner. For example, the information processing device 3 may be connected to the first imaging device 2a via a communication cable or may be connected to the first imaging device 2a via the Internet line. The information processing device 3 may be communicable with the first imaging device 2a via a short-range communicator using radio waves, infrared rays, or the like. The information processing device 3 is communicably connected to the second imaging device 2b. The mode of communication between the information processing device 3 and the second imaging device 2b may be the same as the mode of communication between the information processing device 3 and the first imaging device 2a or different therefrom.

The information processing device 3 acquires information from the first imaging device 2a through communication with the first imaging device 2a. The information processing device 3 acquires information from the second imaging device 2b through communication with the second imaging device 2b. The information processing device 3 uses the information acquired from the first imaging device 2a and the information acquired from the second imaging device 2b to perform information processing. For example, the information processing device 3 performs model integration processing to integrate the first partial model by the first imaging device 2a and the second partial model by the second imaging device 2b in this information processing.

In the first embodiment, the first imaging device 2a detects the second imaging device 2b. The first imaging device 2a uses a result of detecting the second imaging device 2b to calculate position information indicating an absolute or relative positional relation between the first imaging device 2a and the second imaging device 2b. The first imaging device 2a supplies the calculated position information to the information processing device 3. The information processing device 3 uses the position information calculated by the first imaging device 2a to perform model integration processing. For example, when position information between a plurality of imaging devices is absent or when position accuracy indicated by the position information is insufficient, processing to match feature point data of the first partial model and feature point data of the second partial model is performed in the model integration processing. When performing the model integration processing using position information indicating the positional relation between the imaging devices, the imaging system 1, for example, can simplify or omit the processing to match the feature point data.

Figure 2A:
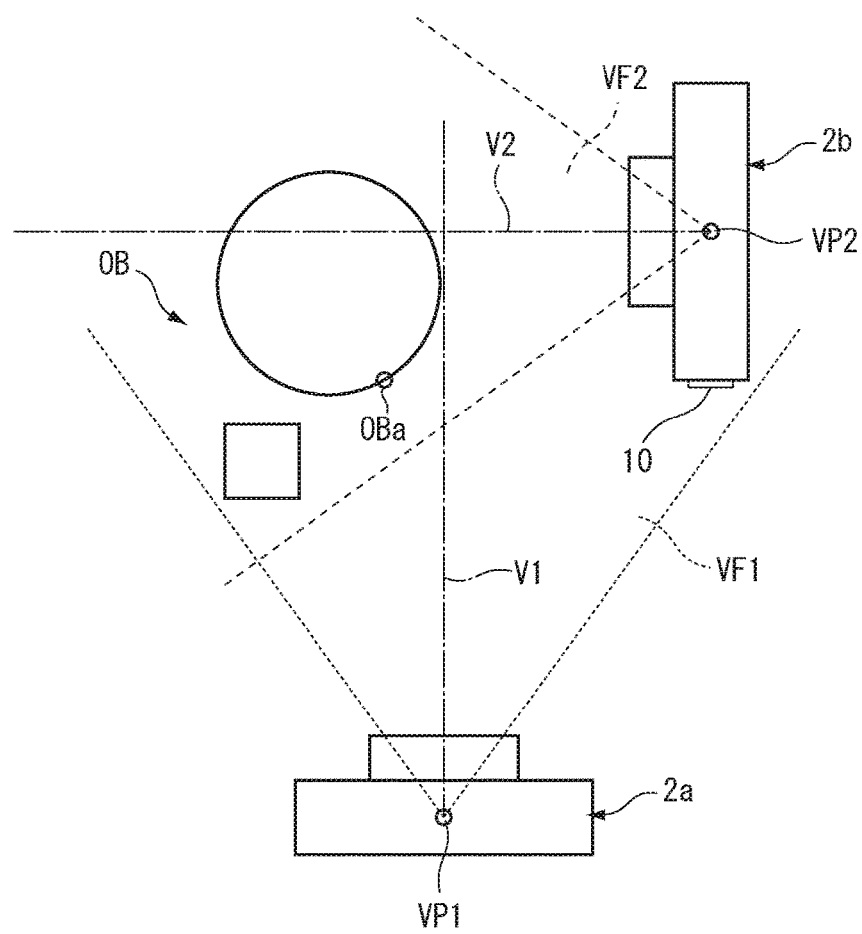
FIGS. 2A and 2B are each an illustrative diagram of position information calculated by a first imaging device according to the first embodiment.
Figure 2B:
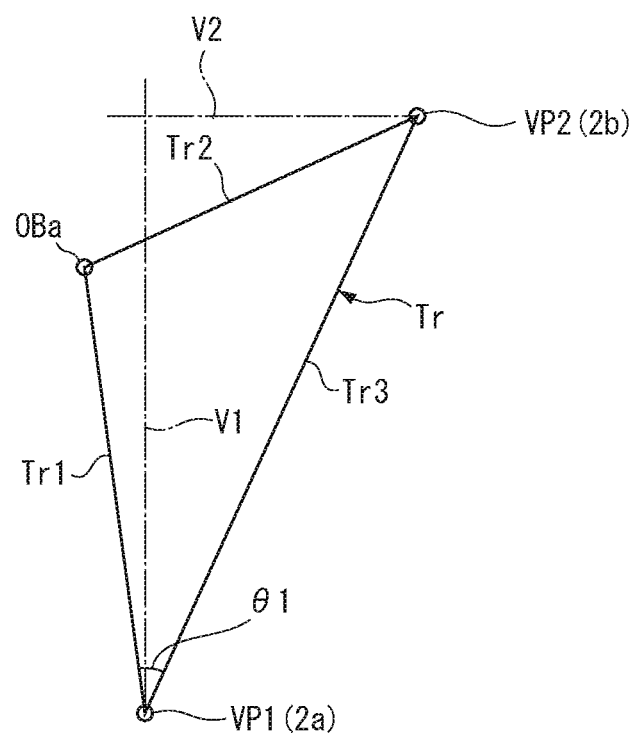

FIGS. 2A and 2B are each a diagram illustrating an example of the position information calculated by the first imaging device 2a. In FIGS. 2A and 2B, the reference symbol VP1 indicates a viewpoint of the first imaging device 2a, and the reference symbol V1 indicates a line of sight of the first imaging device 2a. In FIGS. 2A and 2B, the reference symbol VP2 indicates a viewpoint of the second imaging device 2b, and the reference symbol V2 indicates a line of sight of the second imaging device 2b. For example, the viewpoints of the respective imaging devices are positions (for example, central positions) of respective photo-sensitive surfaces of respective image sensors of the respective imaging devices. For example, the lines of sight of the respective imaging devices are substantially coaxial with the optical axes of the respective imaging devices. For example, the directions of the lines of sight of the respective imaging devices are substantially coaxial directions with the optical axis directions of the respective imaging devices. In FIG. 2A, the reference symbol OBa indicates a freely selected point on the surface of the object OB.

As illustrated in FIG. 2A, for example, the second imaging device 2b is arranged within a field of view VF1 of the first imaging device 2a. For example, the second imaging device 2b includes a presenter 10 that presents an identifier including identification information of its own device. For example, the first imaging device 2a recognizes the second imaging device 2b on the basis of the presenter 10 of the second imaging device 2b. For example, the first imaging device 2a images the identifier of the presenter 10 and performs pattern recognition using the image to recognize the second imaging device 2b.

For example, the first imaging device 2a detects the identifier of the presenter 10 to acquire information on a field of view VF2 of the second imaging device 2b. For example, the information on the field of view VF2 includes at least one of information on the viewpoint VP2 or information on the line of sight V2 of the second imaging device 2b. For example, the first imaging device 2a detects the position of the identifier of the presenter 10 to acquire the position of the viewpoint VP2 of the second imaging device 2b associated with the position of the identifier. For example, the first imaging device 2a detects the attitude of the identifier of the presenter 10 to acquire the direction of the line of sight V2 of the second imaging device 2b associated with the attitude of the identifier.

The first imaging device 2a and the second imaging device 2b can each detect a plurality of points on the surface of the object OB and represent the positions of the respective detected points with three-dimensional coordinates. For example, these three-dimensional coordinates are coordinates in a coordinate system associated with the field of view of each of the imaging devices. For example, this coordinate system may be a Cartesian coordinate system with three directions including a direction corresponding to the horizontal scanning direction, a direction corresponding to the vertical scanning direction, and a direction corresponding to the optical axis of each of the imaging devices as axes. A first coordinate system used by the first imaging device 2a is different from a second coordinate system generally used by the second imaging device 2b in axial directions. As described above, when the first imaging device 2a acquires the information on the field of view VF2 of the second imaging device 2b, the first coordinate system used by the first imaging device 2a and the second coordinate system used by the second imaging device 2b can be made to have compatibility. For example, the coordinates of respective points on the second partial model calculated by the second imaging device 2b can be transformed into coordinates in the first coordinate system used by the first imaging device 2a. For example, points on the first partial model and points on the second partial model can be represented by the same coordinate system.

As illustrated in FIG. 2B, a position (for example, the viewpoint VP1) of the first imaging device 2a, a position (for example, the viewpoint VP2) of the second imaging device 2b, and the position of the freely selected point OBa on the surface of the object OB are represented by a triangle Tr. In FIG. 2B, the reference symbol Tr1, the reference symbol Tr2, and the reference symbol Tr3 each indicate a side of the triangle Tr. The side Tr1 corresponds to the line connecting the first imaging device 2a and the object OB, with the length of the side Tr1 corresponding to the distance from the first imaging device 2a to the point OBa on the object OB. The side Tr2 corresponds to the line connecting the second imaging device 2b and the object OB, with the length of the side Tr2 corresponding to the distance from the second imaging device 2b to the point OBa on the object OB. The side Tr3 corresponds to the line connecting the first imaging device 2a and the second imaging device 2b, with the length of the side Tr3 corresponding to the distance from the first imaging device 2a to the second imaging device 2b. For example, when the triangle Tr is uniquely determined, the positional relation among the point OBa, the first imaging device 2a, and the second imaging device 2b is uniquely determined.

In order for the triangle Tr to be uniquely determined, for example, the lengths of two sides among the sides Tr1 to Tr3 and the interior angle of these two sides may be known. For example, the first imaging device 2a can uniquely determine the triangle Tr by measuring at least the length of the side Tr1, the length of the side Tr3, and an interior angle θ1 of the side Tr1 and the side Tr3. With this determination, for example, with regard to the freely selected point OBa on the surface of the object OB, to what position in the second partial model the position of the point OBa in the first partial model corresponds can be made known, and the first partial model and the second partial model can be made to correspond to each other. The condition on which the triangle Tr is uniquely determined may be other than the above-mentioned condition; for example, the lengths of the three sides may be known, or the length of one side and the interior angles on both sides thereof may be known.

Referring back to FIG. 1, for example, the information processing device 3 uses information on the integrated model to execute image processing (for example, rendering processing) as information processing. For example, on the basis of setting information on a viewpoint (an imaging direction) input to the input device 4 by a user, the information processing device 3 calculates data on an estimated image of the object OB that is viewed from this viewpoint.

The input device 4 includes, for example, at least one of a keyboard, a mouse, a touch panel, a sensor such as an acceleration sensor, a voice input machine, and a touch pen, and is connected to the information processing device 3. For example, the input device 4 receives an input of information from a user, and supplies the input information to the information processing device 3. The display device 5 includes, for example, a liquid crystal display or a touch panel display, and is connected to the information processing device 3. For example, the display device 5 displays an image (for example, an estimated image by the rendering processing) by using image data supplied from the information processing device 3.

For example, the first imaging device 2a may be a portable information terminal, a stationary camera, or a camera the field of view of which is capable of being manually or automatically changed. For example, the imaging system 1 may include a moving device that moves the first imaging device 2a. This moving device may move the first imaging device 2a to change the field of view of the first imaging device 2a. A controller that controls this moving device may be provided in the imaging system 1 or may be provided in, for example, the first imaging device 2a or the information processing device 3. The controller that controls this moving device may be provided in a device outside the imaging system 1.

The first imaging device 2a may be capable of outputting at least a part of the model information to a digital device that is capable of inputting and outputting digital information such as barcodes and two-dimensional codes. This digital device may be capable of displaying or printing digital information including at least a part of the model information on a display or media such as paper. A reader device including a reader (for example, an optical reader) capable of reading the displayed or printed digital information can input the digital information to a storage area in its own device via the reader. The reader device may further include a rendering processor described later. The imaging system 1 may include at least a part of the digital device and the reader device. For example, the first imaging device 2a may include at least a part of the digital device and the reader device.

Figure 3:
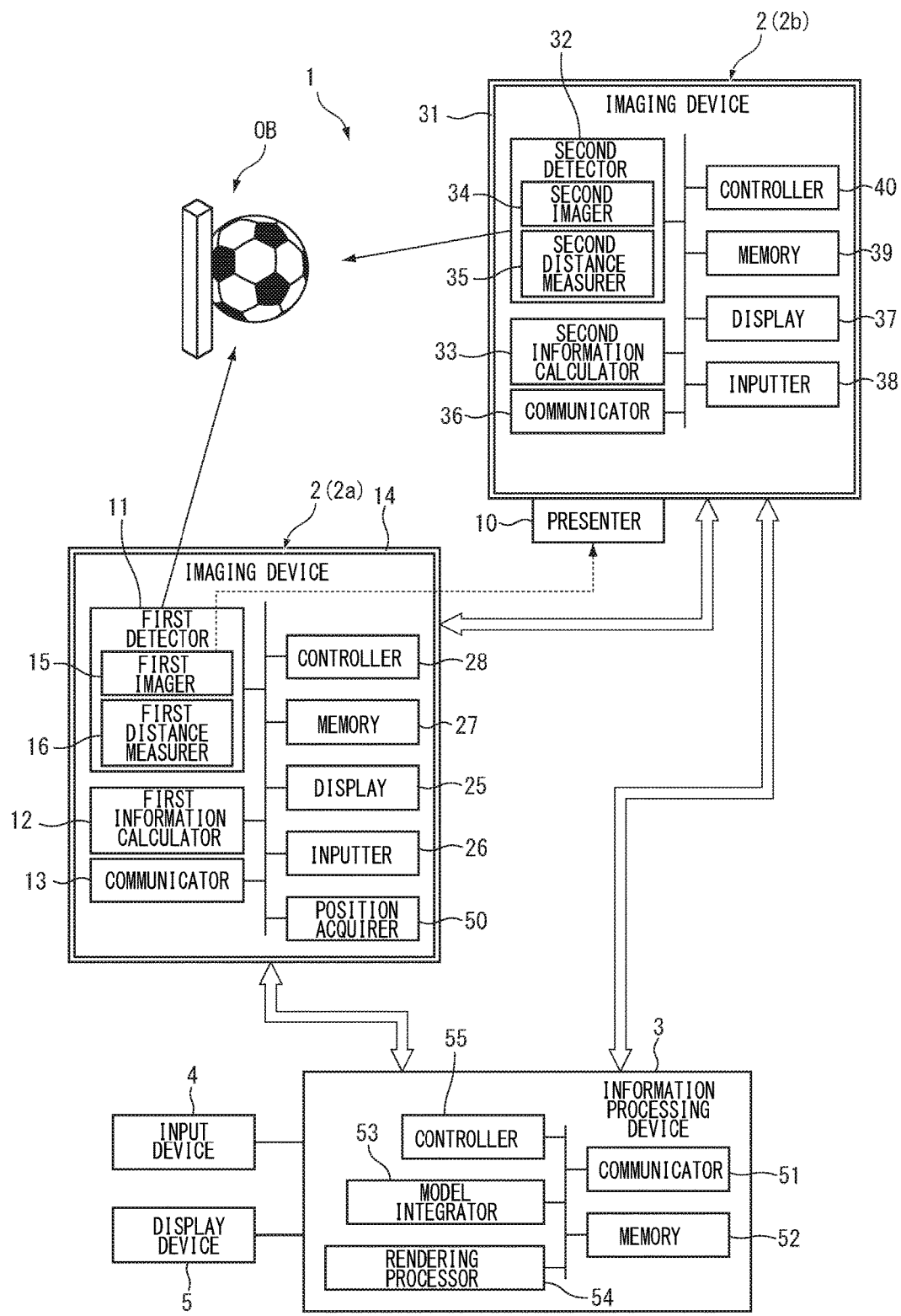
FIG. 3 is a block diagram illustrating the imaging system according to the first embodiment.

Next, each unit in the imaging devices 2 and each unit in the information processing device 3 are described. FIG. 3 is a block diagram illustrating the imaging system 1 according to the first embodiment. The first imaging device 2a includes a first detector 11, a first information calculator 12, and a first body 14. The first body 14 is, for example, a camera body, a case, or a housing. For example, the first body 14 may be supported by a support member such as a tripod or a ceiling-hung fixture. This support member may be a part of the first body 14.

Figure 4A:
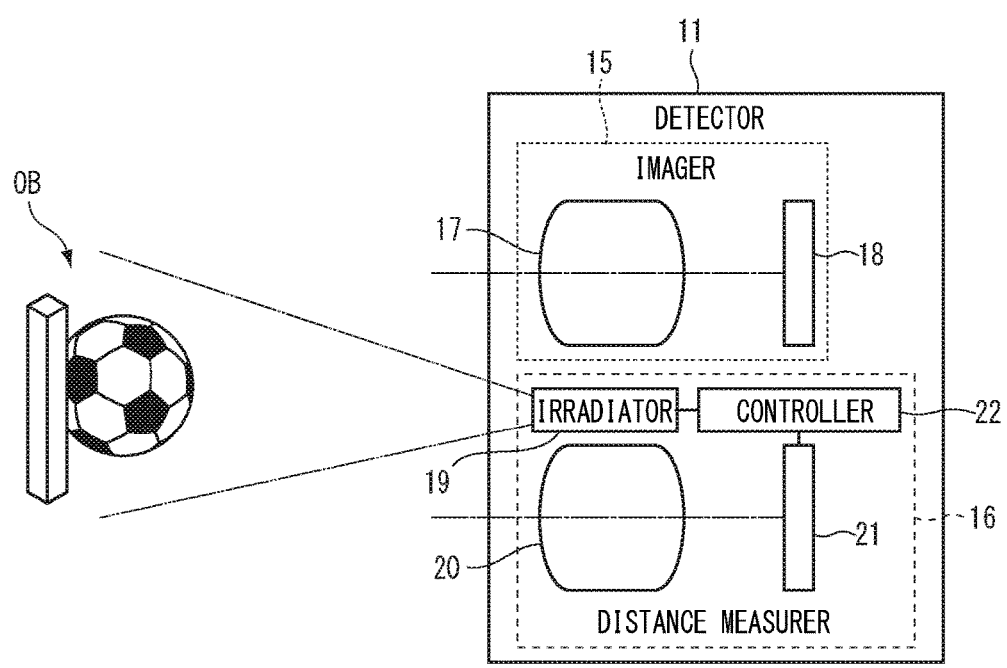
FIGS. 4A and 4B are each a diagram illustrating an example of a first detector according to the first embodiment.

The first detector 11 is provided in the first body 14. FIG. 4A is a diagram illustrating an example of the first detector 11. The first detector 11 includes a first imager 15 and a first distance measurer 16. For example, the first imager 15 includes an image-forming optical system (an imaging optical system) 17 and an image sensor 18. The image sensor 18 is, for example, a CMOS image sensor or a CCD image sensor in which a plurality of pixels are two-dimensionally arrayed. The image sensor 18 is housed in the first body 14. For example, the image sensor 18 has sensitivity to a wavelength band of visible light (for example, 380 nm or more and 750 nm or less) or a wavelength band of infrared light. The imaging result of the image sensor 18 includes, for example, information on gray-scale values of each color of each pixel (for example, RGB data). For example, the image sensor 18 outputs the imaging result (a detection result) in a full-color image data format. A full-color image is, for example, an image in which each of red (R), green (G), and blue (B) of each pixel is represented by a gray-scale value (for example, 256 levels).

The image-forming optical system 17 includes, for example, a plurality of lenses, and forms an image of an object surface (for example, object OB) on the image sensor 18. For example, the image-forming optical system 17 is held in a lens barrel, and is mounted on the first body 14 together with the lens barrel. The image-forming optical system 17 and the lens barrel are, for example, interchangeable lenses, and are detachable from the first body 14. The lens barrel may be a part of the first body 14, and may be undetachable from the first body 14.

The first distance measurer 16 detects (measures) a distance from each point on the surface of the object OB. The first distance measurer 16 detects a distance from each point on the surface of the second imaging device 2b. The first distance measurer 16 includes, for example, a time of flight (ToF) sensor and detects the distance by ToF. For example, the first distance measurer 16 includes a phase difference sensor and detects the distance by phase difference. The first distance measurer 16 includes an irradiator 19, an image-forming optical system (an imaging optical system) 20, an image sensor 21, and a controller 22.

The irradiator 19 is capable of irradiating the object OB with infrared light. The irradiator 19 is controlled by the controller 22. The controller 22 temporally changes (for example, amplitude modulates) the intensity of infrared light applied from the irradiator 19.

The image sensor 21 is, for example, a CMOS image sensor or a CCD image sensor in which a plurality of pixels are two-dimensionally arrayed. The image sensor 21 is housed in the first body 14. The image-forming optical system 20 includes, for example, a plurality of lenses, and forms an image of an object surface (for example, the object OB) on the image sensor 21. The image-forming optical system 20 may be an interchangeable lens or be incorporated in the first body 14. The image sensor 21 has sensitivity to at least a wavelength band of light applied by the irradiator 19. For example, the image sensor 21 is controlled by the controller 22 to detect infrared light reflected and scattered by the object OB.

The controller 22 uses the detection result detected by the image sensor 21 in the first distance measurer 16 to detect a distance from the surface of the object OB to the image sensor 21. For example, when the depth at a first position is different from the depth at a second position on the surface of the object OB, light reflected and scattered at the first position is different from light reflected and scattered at the second position in a travel distance (an optical path) from the object OB to the image sensor 21. Thus, the light reflected and scattered at the first position on the object OB is different from the light reflected and scattered at the second position in the phase of entering the image sensor 21. The controller 22 temporally modulates the intensity of light applied from the irradiator 19, and hence the intensity of light entering the image sensor 21 changes depending on the phase. For example, the controller 22 calculates the depth on the basis of the temporal change of the output of the image sensor 21. For example, the controller 22 calculates the depth on the basis of the distance between the image sensor 21 and the surface of the object OB for each partial area (for example, one pixel or a plurality of pixels) of an image taken by the image sensor 21 and associates the calculated depth (or distance) with the position of the partial area. In this manner, for example, the controller 22 calculates depth information including each depth in a plurality of partial areas.

The irradiator 19 may apply (irradiate) light including visible light, and the image sensor 21 may detect light reflected and scattered by the object OB. For example, the first distance measurer 16 may detect the object OB by the image sensor 21 in a light irradiation state by the irradiator 19 and a non-light irradiation state and calculate depth information by using the difference between detection results in the two states.

The first distance measurer 16 may include a projector camera. In this case, for example, the image sensor 21 detects the object OB while the first distance measurer 16 irradiates the object OB with light (for example, patterned light, structured light, or a texture) having certain intensity distribution from the irradiator 19. The controller 22 uses the intensity distribution of light on the object OB appearing in the image taken by the image sensor 21 to detect the distance between the object OB and the first distance measurer 16. The first distance measurer 16 may include a laser scanner. In this case, the first distance measurer 16 irradiates the object OB with laser light from the irradiator 19 to scan the object OB with the laser light and detects the laser light reflected by the object OB, thereby detecting the distance between the object OB and the first distance measurer 16. For example, to detect the distance from the distance measurer itself (the first distance measurer 16) to the object OB for each pixel of a taken image taken by the first detector 11 or the image sensor 21, the first distance measurer 16 may determine a relative blurring amount from a plurality of taken images having different focal distances for the same object OB and execute depth from defocus (DFD) processing using correlation between an image blurring amount and the distance to detect the distance.

Figure 4B:
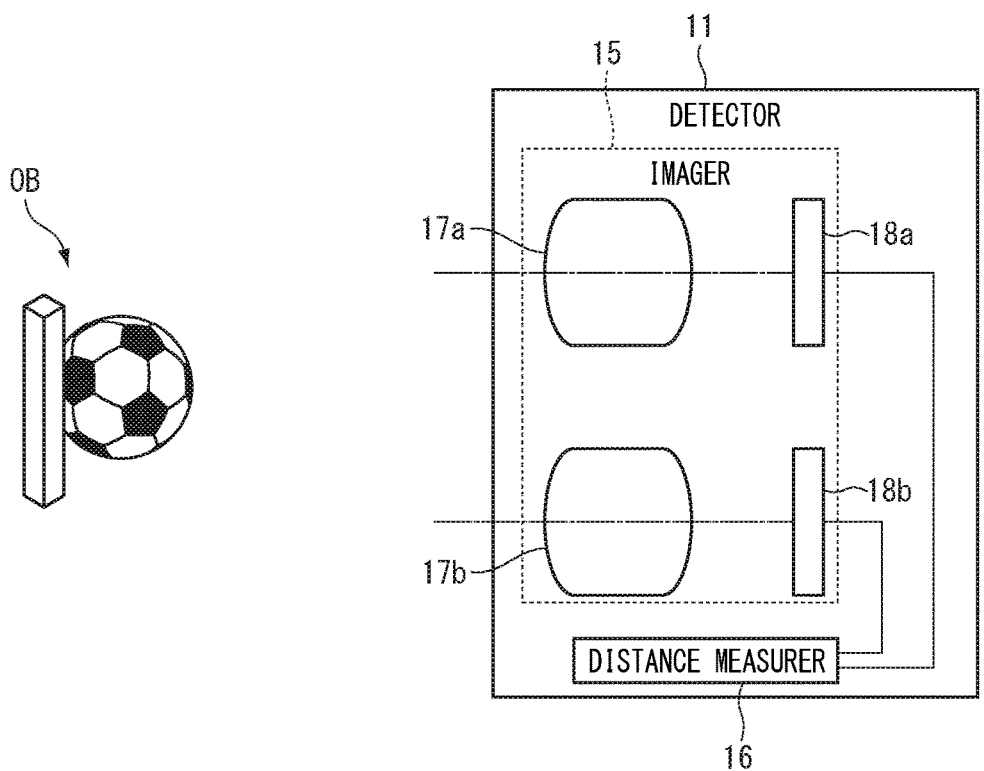

FIG. 4B is a diagram illustrating another example of the first detector 11. The first distance measurer 16 of this first detector 11 uses detection results obtained by detecting the object OB with a plurality of fields of view to detect a distance between the object OB and the first detector 11. The first imager 15 includes an image-forming optical system 17a and an image sensor 18a as well as an image-forming optical system 17b and an image sensor 18b. The image-forming optical system 17a and the image sensor 18a image the object OB in a first field of view. The image-forming optical system 17b and the image sensor 18b image the object OB in a second field of view. The second field of view is different from the first field of view in at least one of the viewpoint and the direction of the line of sight. For example, the viewpoint is a position at which an image of the object is formed, such as the position of the image sensor 18a and the position of the image sensor 18b. For example, the direction of the line of sight is parallel to the direction of an optical axis of an optical member that is disposed closest to the object among optical members through which light headed for the viewpoint passes. For example, the direction of the line of sight in the first field of view is coaxial with the exit-side optical axis of the image-forming optical system 17a. The direction of the line of sight in the second field of view is coaxial with the exit-side optical axis of the image-forming optical system 17b. The first distance measurer 16 detects the distance between the object OB and the first detector 11 by using an image taken by the image sensor 18a and an image taken by the image sensor 18b as parallax images. The first imager 15 may use one image sensor to take an image of the first field of view and an image of the second field of view at different times, and the first distance measurer 16 may use these images to detect the distance between the object OB and the first detector 11.

The first distance measurer 16 may detect a distance expressed by a dimensional value such as meters or detect a relative distance expressed by a dimensionless value normalized by a standard value. For example, the first distance measurer 16 may be in the form of a unit or be externally connectable to the first body 14. At least a part of the optical systems included in the first distance measurer 16 may be shared with at least a part of the optical systems included in the first imager 15. For example, in FIG. 4A, the first distance measurer 16 may be configured such that infrared light in light having passed through the image-forming optical system 17 is branched by a dichroic mirror and the branched infrared light is detected by the image sensor 21. The projector camera may be configured such that the irradiator 19 projects a pattern onto the object OB via the image-forming optical system 17.

Referring back to FIG. 3, the first information calculator 12 includes, for example, a digital signal processor (DSP). The first information calculator 12 uses the detection result of the first detector 11 to calculate at least one of shape information and texture information of the object OB. As the shape information, the first information calculator 12 calculates coordinates of a plurality of points (for example, referred to as "point group data") on the surface of the object OB and surface information including link information between the points. Examples of the surface information include polygon data, vector data, and draw data. The link information includes, for example, information that associates points on both ends of a line corresponding to a ridge line (for example, an edge) of the object OB with each other and information that associates a plurality of lines corresponding to the contour of a surface of the object OB with each other.

First, the first information calculator 12 uses the detection result (for example, the depth information) of the first distance measurer 16 to calculate the point group data (point group data processing). For example, the first information calculator 12 calculates the point group data through perspective transformation from a distance image indicated by the depth information to a planar image. When the first imager 15 and the first distance measurer 16 have different fields of view from each other, for example, the first information calculator 12 may transform the detection result of the first distance measurer 16 into the result of detecting the object OB from the field of view of the first imager 15 through perspective transformation (projective transformation). For example, the first information calculator 12 may execute the perspective transformation by using a parameter that depends on the positional relation (for example, the viewpoint or the direction of the line of sight) between the field of view of the first imager 15 and the field of view of the first distance measurer 16.

For example, the first information calculator 12 estimates a surface between a point selected from among the points included in the point group data and a point in the vicinity thereof and transforms the point group data into polygon data having plane information between points (surface processing). For example, the first information calculator 12 transforms the point group data into polygon data by an algorithm using the least-square method. For example, an algorithm published in a point group processing library may be applied as this algorithm.

Next, the first information calculator 12 calculates texture information by, for example, inverse rendering. The texture information includes, for example, information on at least one item of pattern information representing a pattern of the surface of the object OB, light source information on light applied to the object OB, and optical characteristics information representing optical characteristics (for example, reflectivity and scattering rate) of the surface of the object OB. The light source information includes, for example, information on at least one item of the position of a light source, the direction of light applied from the light source to the object, the wavelength of light applied from the light source, and the type of the light source.

For example, the first information calculator 12 calculates the light source information by using a model that assumes Lambertian reflectance or a model including Albedo estimation. For example, the first information calculator 12 estimates, among pixel values of respective pixels in an image taken by the first imager 15, a component derived from light diffused by the object OB and a component normally reflected by the object OB. For example, the first information calculator 12 uses the result of estimating the component normally reflected by the object OB and the shape information to calculate the direction in which light enters the object OB from the light source. For example, the first information calculator 12 uses the calculated light source information and shape information to estimate reflection characteristics of the object OB and calculates the optical characteristics information including the estimation result of the reflection characteristics. For example, the first information calculator 12 uses the calculated light source information and optical characteristics information to remove the influence of illumination light from visible light image data and calculates pattern information.

The first imaging device 2a according to the first embodiment further includes a display 25, an inputter 26, a memory 27, and a controller 28. The display 25 (see FIG. 1) is, for example, a liquid crystal display or a touch panel display provided to the first body 14. For example, the display 25 displays at least a part of the detection result of the first detector 11 (for example, the visible light image by the first imager 15), calculation results of the first information calculator 12 (for example, the depth map), and various kinds of setting information.

The inputter 26 is, for example, an operation button provided to the first body 14, a touch panel provided to the display 25, a voice input machine that recognizes voice of a user, or a release button. For example, the inputter 26 detects an operation by a user and receives an input of information from the user. The inputter 26 transmits the input information to the controller 28.

The memory 27 is, for example, a non-volatile memory such as a USB memory or a memory card and stores therein various kinds of information. The memory 27 may include a storage device incorporated in the first imaging device 2a and may include a port to which a storage device releasable from the first imaging device 2a is capable of being connected. For example, the first information calculator 12 generates model information obtained by adding header information (for example, identification information such as a number and a code) to information including at least one of shape information and texture information. The communicator 13 transmits the model information.

The header information may include at least one of identification information, the position of the first imaging device 2a (position information), imaging timing by the first imager 15, imaging time by the first imager 15, optical characteristics information on the object OB, and imaging environmental information (for example, light source information and illumination conditions for the object OB). For example, the first information calculator 12 is capable of generating model information having header information on the basis of a certain data format, and transmitting the model information by the communicator 13.

For example, the controller 28 controls each unit in the first imaging device 2a by using an instruction (a control signal) from a user or an external device (for example, the information processing device 3). For example, the controller 28 causes the first detector 11 to execute the above-mentioned detection processing. This detection processing includes, for example, imaging processing by the first imager 15 and distance detection processing by the first distance measurer 16. For example, the controller 28 stores at least a part of the detection result of the first detector 11 in the memory 27. For example, the controller 28 causes the first information calculator 12 to calculate model information. For example, the controller 28 stores at least a part of the model information calculated by the first information calculator 12 in the memory 27.

For example, the memory 27 stores therein the model information for each item. For example, the memory 27 stores therein information on each item of shape information, texture information, light source information, optical characteristics information on the object OB, and pattern information in individual data tables. For example, the controller 28 displays an image indicating at least a part of the information stored in the memory 27 on the display 25. The controller 28 controls the communicator 13 to transmit and receive information via the communicator 13.

For example, the communicator 13 includes at least one of an I/O port such as a USB port and a communication device that performs wireless communication by radio waves or infrared rays. The communicator 13 is controlled by the controller 28 to read information stored in the memory 27 and transmit the read information to an external device. For example, the communicator 13 transmits at least a part of the calculation results of the first information calculator 12 (for example, the model information) to the information processing device 3. For example, the communicator 13 receives information including an instruction from an external device. The communicator 13 is capable of storing the received information in the memory 27 and supplying the received information to the controller 28. When the first imaging device 2a includes the above-mentioned digital device, the communicator 13 may transmit at least a part of the model information to the digital device. The digital device may generate digital information on the basis of the received model information and output this digital information to media such as paper.

The second imaging device 2b includes a second body 31, a second detector 32, a second information calculator 33, and the presenter 10. The second body 31 is arranged at a position separate from the first body 14. The second detector 32 is provided in the second body 31. The second detector 32 includes a second imager 34 that images an object and a second distance measurer 35. For example, the second detector 32 may have the same configuration as the first detector 11.

The second information calculator 33 is provided in the second body 31. The second information calculator 33 uses the detection result of the second detector 32 to calculate at least one of the shape information and the texture information of the object OB. The second imaging device 2b does not necessarily need to include the second information calculator 33. In this case, the second imaging device 2b may supply the detection result of the second detector 32 to an external device, and the external device may use the detection result of the second detector 32 to calculate the second model information. For example, this external device may be the information processing device 3, the first imaging device 2a, or a device (for example, a cloud computer) outside the imaging system 1.

The second imaging device 2b further includes a communicator 36, a display 37, an inputter 38, a memory 39, and a controller 40. The communicator 36, the display 37, the inputter 38, and the memory 39 may have the same configuration as, for example, the communicator 13, the display 25, the inputter 26, and the memory 39, respectively, in the first imaging device 2a. The controller 40 controls each unit in the second imaging device 2b.

For example, the presenter 10 is provided on an outer face of the second body 31. The presenter 10 presents the identifier including the identification information of the second imaging device 2b (for example, the second body 31) to the outside. For example, the identification information of the second imaging device 2b includes individual identification information (for example, an ID) including which imaging device among the imaging devices of the imaging system 1 its own device is. For example, the individual identification information is represented by a number, a character, a figure, or a code such as a pattern assigned the imaging devices of the imaging system 1 without redundancy. For example, the presenter 10 is a sticker or a chip on which a certain code is printed and is attached to the outer face of the second body 31 through adhesion or the like. For example, the presenter 10 may be built in the surface of the second body 31.

FIGS. 5A, 5B, 5C, 5D, and 5E are each diagram illustrating an example of an identifier according to the first embodiment. 41. The identifier 41 in FIG. 5A includes figures such as a triangle, a rectangle, and a circle. The identifier 41 in FIG. 5B includes characters such as "CAM" and "2". The identifier 41 in FIG. 5C includes patterns such as a one-dimensional barcode and a two-dimensional barcode. The identifier 41 may be a combination of two or more of figures, characters, and patterns.

Figure 5A:
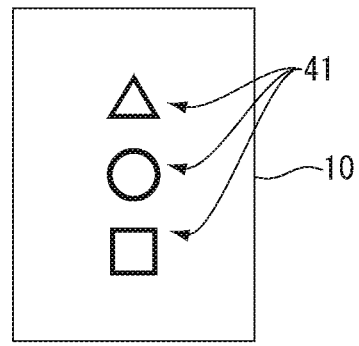
FIGS. 5A, 5B, 5C, 5D, and 5E are each a diagram illustrating an example of an identifier according to the first embodiment.
Figure 5B:
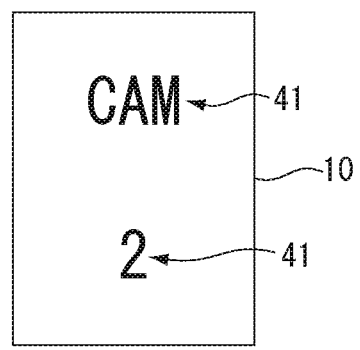
Figure 5C:
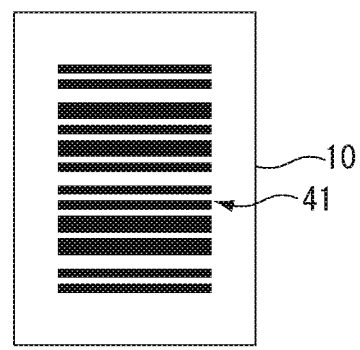
Figure 5D:
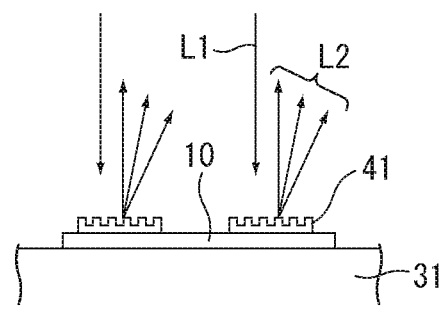

The identifier 41 in FIG. 5D emits light the light intensity of which changes in accordance with an angle relative to a certain direction set relative to the second body 31. For example, this identifier 41 includes a diffraction grating, a hologram element, a lenticular lens, a retroreflective member, or an optical element in which prismatic prisms are periodically arranged. For example, when the identifier 41 includes a diffraction grating, and when the first detector 11 irradiates the identifier 41 with detection light L1 (for example, laser light), a plurality of pieces of diffracted light L2 such as zeroth diffracted light, first diffracted light, and second diffracted light occur in the diffraction grating. In the pieces of diffracted light L2, the directions of the respective pieces of diffracted light emitted from the diffraction grating change in accordance with the order, and the light intensities of the respective pieces of diffracted light change in accordance with the order. For example, when the normal direction of the surface of the second body 31 at the position in which the identifier 41 is provided is set as the certain direction, the order of the detected diffracted light is determined from the light intensity of the diffracted light detected by the first detector 11, and the angle between the direction connecting the first detector 11 and the identifier 41 and the certain direction can be calculated.

Figure 5E:
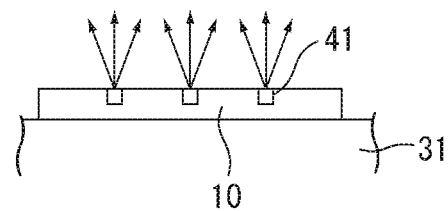

The identifier 41 in FIG. 5E includes a light-emitting part such as an LED. For example, this identifier 41 is controlled by the controller 40 in the second imaging device 2b and is turned on and off at certain timing. The identifier 41 can represent the identification information with a pattern of turning on and off. For example, the presenter 10 can also present the identification information through spatial distribution (a pattern) of the turning on and off of a plurality of identifiers 41. The presenter 10 can present the identification information through a pattern that temporally changes by switching the spatial distribution of turning on and off.

Figure 6A:
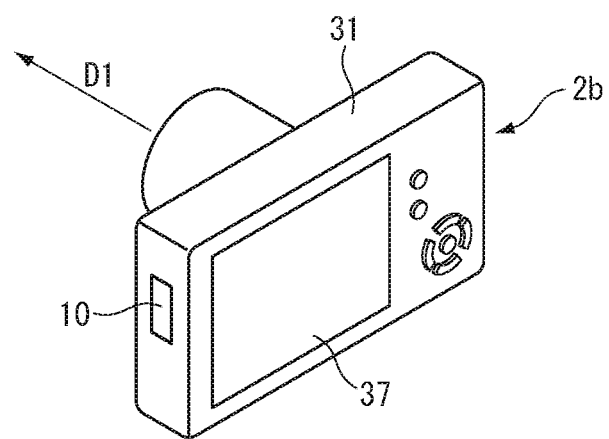
FIGS. 6A, 6B, and 6C are each a diagram illustrating an example of arrangement of a presenter according to the first embodiment.

FIG. 6 is a diagram illustrating an example of arrangement of the presenter 10. In FIG. 6A, the presenter 10 is provided on a side relative to an imaging direction D1 of the second imager 34. For example, the presenter 10 may be provided on each of a plurality of faces of the second body 31. In this case, a range in which at least one of a plurality of presenters is capable of being detected is wide around the second body 31.

Figure 6B:
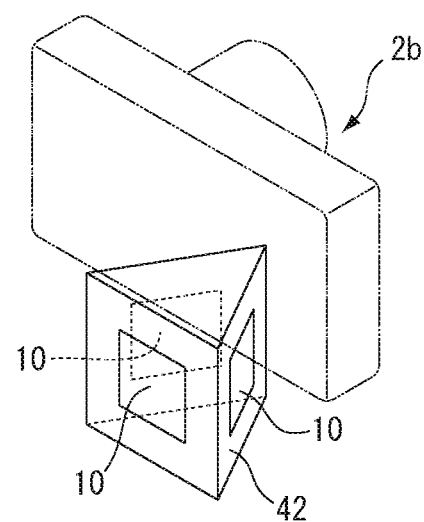

In FIG. 6B, a plurality of presenters 10 are arranged on a support member 42 provided on the second body 31. For example, this support member 42 has a triangular prismatic shape extending in the vertical direction. The presenters 10 are arranged on the respective three side faces of the support member 42. When such presenters 10 are used, at least one of the presenters 10 can be detected from any side direction of the support member 42. For example, the presenters 10 present the identification information including information on the surfaces on which the respective ones are arranged. In this case, by using the detected identification information, for example, a direction in which the presenter 10 has been detected can be identified.

Figure 6C:
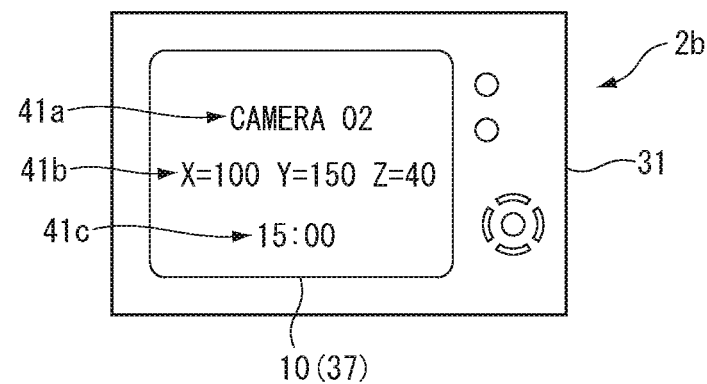

In FIG. 6C, the display 37 also functions as the presenter 10. For example, the display 37 displays (presents) individual identification information 41a, position information 41b of the second imaging device 2b, and operation information 41c of the second imaging device 2b as the identification information. For example, the operation information 41c includes information indicating timing when the second imaging device 2b detects the object. For example, the operation information 41c may include information such as a focal length or magnification when the second imaging device 2b detects the object OB. For example, the identification information may include information indicating a device parameter of the second imaging device 2b. For example, the information indicating the device parameter may include at least one of optical characteristics, distortion, aberration, and a relative position between the presenter 10 and the second detector 32.

Referring back to FIG. 3, the imaging system 1 includes a position acquirer 50 that acquires position information indicating the positional relation between the first detector 11 and the second detector 32 on the basis of the identification information detected by the first imager 15. For example, the position acquirer 50 is provided in the first body 14.

The position acquirer 50 identifies the identifier in an image obtained by imaging the second imaging device 2b by the first imager 15. For example, information on the code of the identifier is stored in the memory 27 in advance. The position acquirer 50 acquires information (hereinafter referred to as "reference information") on the code of the identifier stored in advance. For example, the position acquirer 50 compares the taken image of the second imaging device 2b by the first imager 15 and the code indicated by the reference information to detect the position of the identifier (the presenter 10) in the taken image.

For example, the position acquirer 50 uses the position of the identifier (the presenter 10) in the taken image and depth information obtained from the result obtained by detecting the second imaging device 2b by the first distance measurer 16 to detect a distance from the first detector 11 to the identifier. For example, the position acquirer 50 uses information indicating a relative position between the identifier and the second detector 32 to calculate the distance between the first detector 11 and the second detector 32. The position acquirer 50 may calculate the length of the side Tr3 illustrated in FIG. 2B through the above-mentioned processing.

The position acquirer 50 may use the size of the identifier in the taken image to detect the distance from the first detector 11 to the identifier. For example, when information on the angle of view, the focal point information (for example, focusing information or a focal length), the magnification, or the like of the first imager 15 is used, the relation between size in real space corresponding to one pixel of the taken image and the distance from the first imager 15 is obtained. For example, the size of the identifier in real space is indicated in the reference information, and the position acquirer 50 may compare the size of the identifier indicated in the reference information and the size of the identifier in the taken image to calculate the distance from the first detector 11 to the identifier.

The position acquirer 50 compares the identifier in the taken image and the code of the identifier indicated by the reference information by using affine transformation or the like to calculate the attitude of the surface on which the identifier is formed. For example, the position acquirer 50 calculates an angle between the normal direction of the surface of the presenter 10 and the line of sight of the first imager 15. For example, the angle between the surface of the presenter 10 and the line of sight of the second imaging device 2b is indicated in the reference information. For example, the position acquirer 50 can calculate the angle between the line of sight V1 of the first imaging device 2a and the line of sight V2 of the second imaging device 2b illustrated in FIG. 2A by using the angle between the surface of the presenter 10 and the line of sight of the second imaging device 2b indicated in the reference information and the calculated angle between the surface of the presenter 10 and the line of sight of the first imager 15.

The distance (the length of the side Tr1) from the first detector 11 to the point OBa on the object OB and the angle between the side Tr1 and the line of sight V1 of the first imaging device 2a illustrated in FIG. 2B are obtained from the detection result of the first detector 11. The position acquirer 50 can also calculate the interior angle θ1 by using the angle between Tr1 and the line of sight V1 of the first imaging device 2a and the angle between the side Tr3 and the line of sight V1 of the first imaging device 2a. With this processing, with regard to the freely selected point on the surface of the object OB, for example, the triangle Tr illustrated in FIG. 2B can be uniquely determined. For example, information indicating the positional relation among the first imaging device 2a, the second imaging device 2b, and the point OBa on the surface of the object OB can be calculated.

Referring back to FIG. 3, for example, the information processing device 3 includes a communicator 51, a memory 52, a model integrator 53, a rendering processor 54, and a controller 55. For example, the communicator 51 includes at least one of a USB port, a network card, or a communication device that performs wireless communication by radio waves or infrared rays. The communicator 51 is communicable with the communicator 13 in the first imaging device 2a and the communicator 36 in the second imaging device 2b.

For example, the memory 52 includes a removable storage medium such as a USB memory or an external or built-in large-capacity storage device such as a hard disk. For example, the memory 52 stores therein data on at least a part of information received via the communicator 51, an imaging control program for controlling the imaging devices 2, and a processing program for executing each processing in the information processing device 3.

The model integrator 53 integrates the first model information calculated on the basis of the result (a first detection result) of detecting the object OB from the first direction and the second model information calculated on the basis of the result (a second detection result) of detecting the object OB from the second direction to generate integrated model information. For example, the model integrator 53 uses the first model information supplied from the first imaging device 2a, the position information supplied from the first imaging device 2a, and the second model information supplied from the second imaging device 2b to perform the model integration processing.

For example, the first model information includes shape information represented by three-dimensional coordinates in the first coordinate system determined by the position and the attitude of the first imaging device 2a. For example, the second model information includes shape information represented by three-dimensional coordinates in the second coordinate system determined by the position and the attitude of the second imaging device 2b. For example, the model integrator 53 uses position information indicating the positional relation between the first imaging device 2a and the second imaging device 2b to transform the shape information of the second model information represented in the second coordinate system into the shape information represented in the first coordinate system. For example, the model integrator 53 integrates the shape information of the first model information represented in the first coordinate system and the shape information of the second model information represented in the first coordinate system to calculate the integrated model information.

When the position information indicating the positional relation between the first imaging device 2a and the second imaging device 2b is thus used, for example, the integrated model information can be calculated on the basis of the position information with the feature point matching between the first model information and the second model information omitted. When the position information is used, even when there is no overlapping part between the first partial model corresponding to the first model information and the second partial model corresponding to the second model information, the integrated model information can be calculated. In the model integration processing, feature point matching may be performed between the first model information and the second model information. In this case, for example, when the space of the first model information is searched for a feature point in the space of the second model information, the position information is used, whereby a search range for the feature point can be reduced, and load on the processing can be reduced.

The rendering processor 54 includes, for example, a graphics processing unit (GPU). The rendering processor 54 may be configured such that a CPU and a memory execute each processing in accordance with an image processing program. For example, the rendering processor 54 executes at least one of drawing processing, texture mapping processing, or shading processing.

In the drawing processing, for example, the rendering processor 54 can calculate an estimated image (for example, a reconstructed image) in which the shape defined by shape information in model information is viewed from a freely selected viewpoint. In the following description, the shape indicated by shape information is referred to as "model shape". For example, the rendering processor 54 can reconstruct a model shape (for example, an estimated image) from model information (for example, shape information) through the drawing processing. For example, the rendering processor 54 stores data on the calculated estimated image in the memory 52. The imaging devices 2 are each capable of transmitting at least a part of the model information to the information processing device 3, and hence, for example, the information processing device 3 can reduce load on the rendering processing. For example, the imaging devices 2 do not need to transmit all images taken by the first imager 15 to the information processing device 3, but can transmit at least a part of the model information (for example, shape information and texture information) calculated by the first information calculator 12 to the information processing device 3. Consequently, the imaging devices 2 according to the first embodiment can each reduce communication load on information necessary for the drawing processing by the rendering processor 54.

In the texture mapping processing, for example, the rendering processor 54 can calculate an estimated image obtained by attaching an image indicated by the texture information in the model information to the surface of the object on the estimated image. The rendering processor 54 can also calculate an estimated image obtained by attaching another texture than the object OB on the surface of the object on the estimated image.

In the shading processing, for example, the rendering processor 54 can calculate an estimated image in which the shade formed by a light source indicated by the light source information in the model information is added to the object on the estimated image. In the shading processing, for example, the rendering processor 54 can calculate an estimated image in which the shade formed by a freely selected light source is added to the object on the estimated image.

For example, the controller 55 controls each unit in the information processing device 3, the imaging devices 2, the input device 4, and the display device 5. For example, the controller 55 controls the communicator 51 to transmit an instruction (a control signal) and setting information to each of the imaging devices 2. For example, the controller 55 stores information received by the communicator 51 from the imaging devices 2 in the memory 52. For example, the controller 55 controls the rendering processor 54 to execute the rendering processing.

For example, the controller 55 controls the imaging devices 2 by transmitting an instruction (a signal) to the imaging devices 2 via the communicator 51. For example, the controller 55 controls the communicator 51 to transmit, to the imaging devices 2, an instruction (a request signal) that requests transmission of certain information. The controller 55 may transmit an instruction that instructs the imaging devices 2 to execute each processing to the imaging devices 2. For example, the controller 55 may transmit an instruction that instructs the first detector 11 in the first imaging device 2a to execute detection processing to the first imaging device 2a. For example, the controller 55 may transmit an instruction that instructs the first information calculator 12 in the first imaging device 2a to execute processing to calculate the model information to the first imaging device 2a. The controller 55 in the information processing device 3 may transmit an instruction that instructs the first imager 15 in the first imaging device 2a to execute imaging of the object OB and an instruction that instructs the first imager 15 to set imaging conditions for the object OB to the first imaging device 2a. The controller 55 in the information processing device 3 may transmit an instruction that causes the first imaging device 2a to execute processing to detect the identification information of the second imaging device 2b to the first imaging device 2a.

For example, the communicator 13 transmits information calculated by the first information calculator 12 selectively for each item. For example, the setting information stored in the memory 27 includes transmission item information that defines whether to transmit information on each item in the model information and transmission order information that defines the order of transmitting the information on each item. For example, the setting information can be updated by operation of the inputter 26 or an instruction from the information processing device 3. For example, the controller 28 controls the communicator 13 to transmit the information on items determined by the transmission item information in the order determined by the transmission order information. For example, the controller 28 may control the communicator 13 to transmit the information on items (for example, shape information and texture information) determined by the transmission item information at a time on the basis of a certain data format.

For example, the transmission item information may be set in accordance with whether corresponding information is used for the rendering processing by the information processing device 3. For example, in some cases, the rendering processing involves combining the shape of the object OB with texture different from the object OB. In this case, for example, the information processing device 3 can execute the rendering processing by using the shape information of the object OB without using the texture information of the object OB. For example, the transmission item information is set as information that defines that the shape information is transmitted but the texture information is not transmitted. In this case, the first information calculator 12 does not necessarily need to calculate the texture information.

For example, the rendering processing may involve calculating an image in which illumination on the object OB is changed. For example, the information processing device 3 can execute the rendering processing by using the shape information, the pattern information, and the optical characteristics information on the object OB without using the light source information. In this case, for example, the transmission item information is set as information that defines that the shape information, the pattern information, and the optical characteristics information are transmitted but the light source information is not transmitted. For example, the transmission item information is set as information that defines that at least one piece of information of the shape information, the texture information, the pattern information, the light source information, or the optical characteristics information is transmitted. The imaging devices 2 can reduce load on communication when a part of the model information is transmitted, for example.

For example, the transmission order information may be set depending on the priority order in the rendering processing by the information processing device 3. For example, the transmission order information may be set such that information on an item that is used first in the rendering processing is transmitted first. For example, in some cases, the rendering processing involves calculating an image of an object OB having no texture while changing viewpoints and after determining the viewpoint, calculating an image of an object OB having texture viewed from the viewpoint. For example, the information processing device 3 can calculate an image of the object OB having no texture while changing the viewpoint by using the shape information without using the texture information. For example, the transmission item information is set as information that defines that the shape information is transmitted first and the texture information is transmitted after the shape information. For example, when the information on each item in the model information is transmitted in the order corresponding to the priority order in the rendering processing by the information processing device 3, the imaging devices 2 can transmit the information in parallel to a part of the rendering processing by the information processing device 3. For example, the controller 28 in the first imaging device 2a can concurrently execute at least a part of the calculation of the model information by the first information calculator 12 and the information transmission processing by the communicator 13.

For example, the controller 55 in the information processing device 3 stores information input to the input device 4 in the memory 52. The information input to the input device 4 includes, for example, setting information in the rendering processing. The setting information includes, for example, at least one of data subjected to the drawing processing (for example, the shape information in the model information), information on the viewpoint in the drawing processing, data on an object to which texture is attached in the texture mapping processing, information (for example, the texture information in the model information) on the texture to be attached in the texture mapping processing, or information (for example, the light source information in the model information) on a light source in the shading processing. For example, the rendering processor 54 executes the rendering processing in accordance with the setting information.

For example, the controller 55 displays an image indicating various kinds of information stored in the memory 52 on the display device 5. For example, the controller 55 displays the setting information in the rendering processing on the display device 5 and receives a change of the setting information by the input device 4. The controller 55 displays an image indicated by the estimated image data stored in the memory 52 on the display device 5.

The information processing device 3 does not necessarily need to display the estimated image obtained by the rendering processing on the display device 5, and in this case, the imaging system 1 does not necessarily need to include the display device 5. For example, the information processing device 3 may transmit at least a part of the estimated image data calculated through the rendering processing to another device (a reproduction device) via the communicator 51, and the other device may display the image. For example, the information processing device 3 may transmit the estimated image data to the communicator 13 in the first imaging device 2a via the communicator 51, and the first imaging device 2a may display an estimated image on the display 25 on the basis of the estimated image data received via the communicator 13. For example, the reproduction device acquires information (the estimated image) calculated through rendering processing and displays the information on the display.

The information processing device 3 may receive various kinds of setting information from another device via the communicator 51, and in this case, the imaging system 1 does not necessarily need to include the input device 4. For example, the first imaging device 2a may transmit the setting information in the rendering processing (for example, information on viewpoint based on which the estimated image is calculated) to the communicator 51 in the information processing device 3 via the communicator 13. The information processing device 3 may execute the rendering processing in accordance with the setting information in the rendering processing received from the first imaging device 2a.

The first imaging device 2a may transmit an instruction that requests the estimated image data calculated through the rendering processing to the communicator 51 in the information processing device 3 via the communicator 13. The information processing device 3 may transmit the estimated image data to the communicator 13 in the first imaging device 2a via the communicator 51 as a response to the instruction from the first imaging device 2a. The first imaging device 2a may transmit the above-mentioned request instruction as a part of the setting information in the rendering processing or as another instruction (for example, a control signal) than the setting information in the rendering processing.

When executing the above-mentioned various kinds of processing under the control of the information processing device 3, the first imaging device 2a does not necessarily need to include at least a part of the controller 28, the memory 27, the display 25, and the inputter 26. The same holds true for the second imaging device 2b. For example, the first imaging device 2a may execute the various kinds of processing described above in response to user's operation and does not necessarily need to be controlled by the information processing device 3. For example, the first imaging device 2a may execute the various kinds of processing described above without receiving any instruction (control signal) from an external device and may execute the various kinds of processing described above in response to user's operation or in accordance with a preset processing schedule. The first imaging device 2a may transmit calculation results of the first information calculator 12 (for example, the model information) to another device in the information processing device 3 via the communicator 13.

Figure 7:
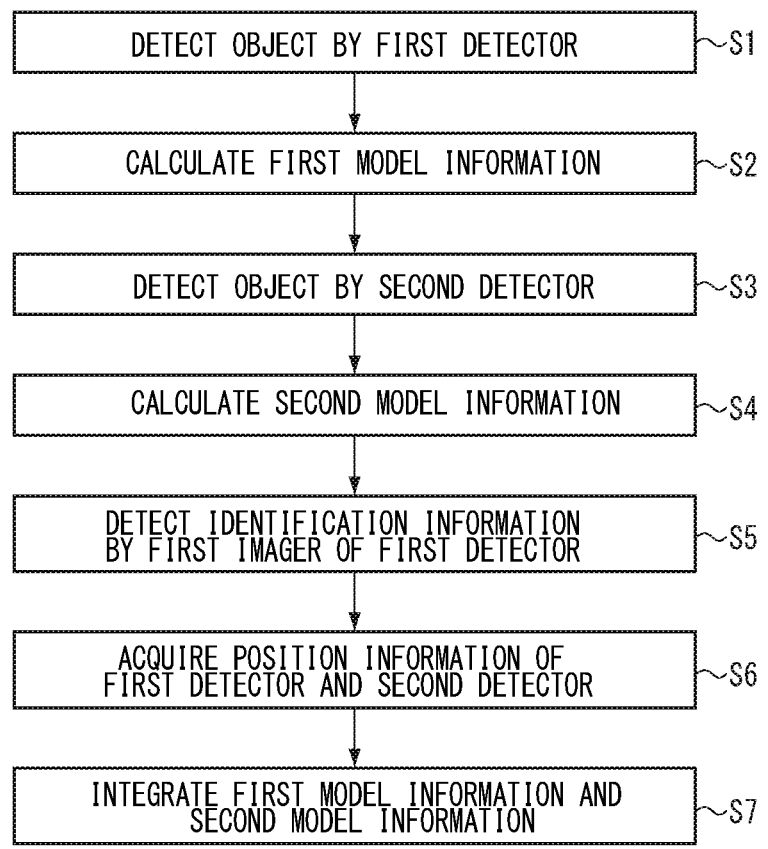
FIG. 7 is a flowchart illustrating an operation of the imaging system according to the first embodiment.

Next, a method of imaging according to the first embodiment is described on the basis of an operation of the imaging system 1. FIG. 7 is a flowchart illustrating the operation of the imaging system 1. In Step S1 in FIG. 7, the first imaging device 2a detects the object OB from a first direction by the first detector 11 and acquires, for example, visible light image data and point group data. In Step S2, the first information calculator 12 uses the detection result of the first detector 11 in Step S1 to calculate the first model information.

In Step S3, the second imaging device 2b detects the object OB from a second direction by the second detector 32 and acquires, for example, visible light image data and point group data. In Step S4, the second information calculator 33 uses the detection result of the second detector 32 in Step S3 to calculate the second model information.

The processing in Step S3 may be executed in parallel to at least a part of the processing in Step S1 and Step S2 or executed before the processing in Step S1 and Step S2. The processing in Step S4 may be executed at any timing after the processing in Step S3.

In Step S5, the first imaging device 2a detects the identification information of the second imaging device 2b by the first imager 15 in the first detector 11. In Step S6, the first imaging device 2a uses the identification information detected in Step S5 to acquire position information indicating the positional relation between the first detector 11 and the second detector 32 by the position acquirer 50.

The processing in Step S5 may be executed in parallel to at least a part of the processing in Step S3 and Step S4. When the object OB and the second imaging device 2b are arranged within the field of view of the first imaging device 2a, the processing in Step S5 may be executed in parallel to at least a part of the processing in Step S1 and Step S2. The processing in Step S5 may be executed before the processing in Step S1.

In Step S7, the information processing device 3 integrates the first model information and the second model information by the model integrator 53. The model integrator 53 uses the first model information supplied from the first imaging device 2a, the position information supplied from the first imaging device 2a, and the second model information supplied from the second imaging device 2b to perform the model integration processing.

Figure 8:
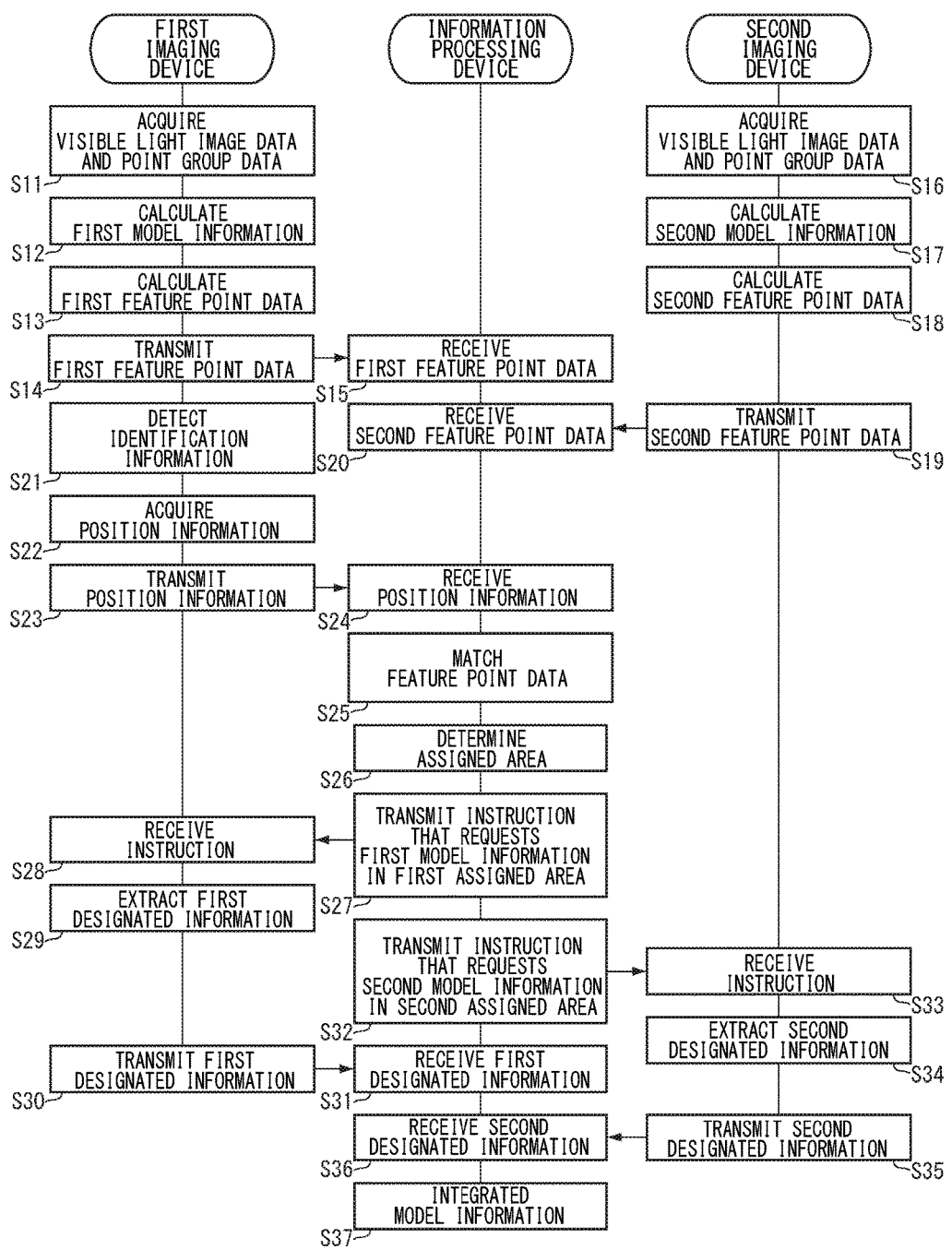
FIG. 8 is a sequence diagram illustrating the operation of the imaging system according to the first embodiment.

FIG. 8 is a sequence diagram illustrating another example of the operation of the imaging system 1. In this example, the imaging system 1 matches feature points to calculate the integrated model information. In Step S11, the first imaging device 2a detects the object OB from the first direction to acquire visible light image data and point group data. In Step S12, the first information calculator 12 calculates the first model information. In Step S13, the first information calculator 12 uses at least one of the shape information and the texture information included in the first model information to detect a first feature point and calculates first feature point data indicating the position of the first feature point and the feature amount (a first feature amount) of the feature point. In Step S14, the first imaging device 2a transmits the first feature point data to the information processing device 3. In Step S15, the information processing device 3 receives the first feature point data from the first imaging device 2a.

In Step S16, the second imaging device 2b detects the object OB from the second direction to acquire visible light image data and point group data. In Step S17, the second information calculator 33 calculates the second model information. In Step S18, the second information calculator 33 uses at least one of the shape information and the texture information included in the second model information to detect a second feature point and calculate second feature point data indicating the position of the second feature point and the feature amount (a second feature amount) of the feature point. In Step S19, the second imaging device 2b transmits the second feature point data to the information processing device 3. In Step S20, the information processing device 3 receives the second feature point data from the second imaging device 2b.

In Step S21, the first imaging device 2a calculates the identification information of the second imaging device 2b. In Step S22, the first imaging device 2a uses the identification information to acquire the position information indicating the positional relation between the first imaging device 2a and the second imaging device 2b. In Step S23, the first imaging device 2a transmits the position information to the information processing device 3. In Step S24, the information processing device 3 receives the position information from the first imaging device 2a. At least one of the first feature point data and the second feature point data may be calculated by the information processing device 3. In this case, for example, the information processing device 3 may acquire the first model information from the first imaging device 2a and calculate the first feature point data on the basis of this first model information. The information processing device 3 may similarly calculate the second feature point data.

In Step S25, the information processing device 3 uses the position information to match the first feature point data and the second feature point data (feature part matching processing). In the matching processing, for example, the information processing device 3 searches the space of the second feature point data for a part similar to a feature part included in the first feature point data. For example, the information processing device 3 estimates a part corresponding to the feature part of the first feature point data in the space of the second feature point data using the position information and searches the estimated part and therearound (around the estimated part). Consequently, compared with a case in which the position information is not used, for example, load on processing required for the search can be reduced.

In Step S26, the information processing device 3 determines (sets) a first assigned area to be assigned to the first model information from the first imaging device 2a and a second assigned area to be assigned to the second model information from the second imaging device 2b in the integrated model information. For example, the model integrator 53 selects the assigned areas such that the first assigned area and the second assigned area do not overlap with each other.

In Step S27, the controller 55 in the information processing device 3 controls the communicator 51 to transmit, to the communicator 13 in the first imaging device 2a, an instruction (a first request signal) that requests transmission of the first model information in the first assigned area. The first model information in the first assigned area is hereinafter referred to as "first designated information". Examples of the first designated information include information on a partial shape of the shape indicated by the first model information. In Step S28, the communicator 13 in the first imaging device 2a receives the instruction in Step S27. In Step S29, the first information calculator 12 extracts the first designated information from the first model information. In Step S30, the communicator 13 in the first imaging device 2a transmits the first designated information to the communicator 51 in the information processing device 3. In Step S31, the communicator 51 receives the first designated information from the communicator 13.

In Step S32 after the processing of Step S27, the controller 55 in the information processing device 3 controls the communicator 51 to transmit, to the communicator 36 in the second imaging device 2b, an instruction (a second request signal) that requests transmission of the second model information in the second assigned area. The second model information in the second assigned area is hereinafter referred to as "second designated information". Examples of the second designated information include information on a partial shape of the shape indicated by the second model information. In Step S33, the communicator 36 in the second imaging device 2b receives the instruction in Step S32. In Step S34, the second information calculator 33 extracts the second designated information from the second model information. In Step S35, the communicator 36 in the second imaging device 2b transmits the second designated information to the communicator 51 in the information processing device 3. In Step S36, the communicator 51 receives the second designated information from the communicator 36. In Step S37, the model integrator 53 in the information processing device 3 integrates the first designated information, which is a part of the first model information, and the second designated information, which is a part of the second model information, to calculate the integrated model information.

In the above-mentioned embodiment, the first imaging device 2a detects the attitude of the second imaging device 2b or does not necessarily need to detect the attitude of the second imaging device 2b. For example, the second imaging device 2b may include an azimuth sensor such as a geomagnetic sensor to detect the attitude of the second body 31 by the azimuth sensor. In this case, the first imaging device 2a may acquire the attitude of the second imaging device 2b (the second body 31) via communication with the second imaging device 2b after the detection of the identification information of the second imaging device 2b.

The second body 31 in the second imaging device 2b does not necessarily need to include the presenter 10. For example, the first imaging device 2a may detect at least one of shape information and texture information of the second imaging device 2b as the identification information. The first imaging device 2a and the second imaging device 2b may each include the presenter 10, and the first imaging device 2a and the second imaging device 2b may each include the position acquirer 50. The second imaging device 2b may detect identification information of the first imaging device 2a.

Second Embodiment

Figure 9A:
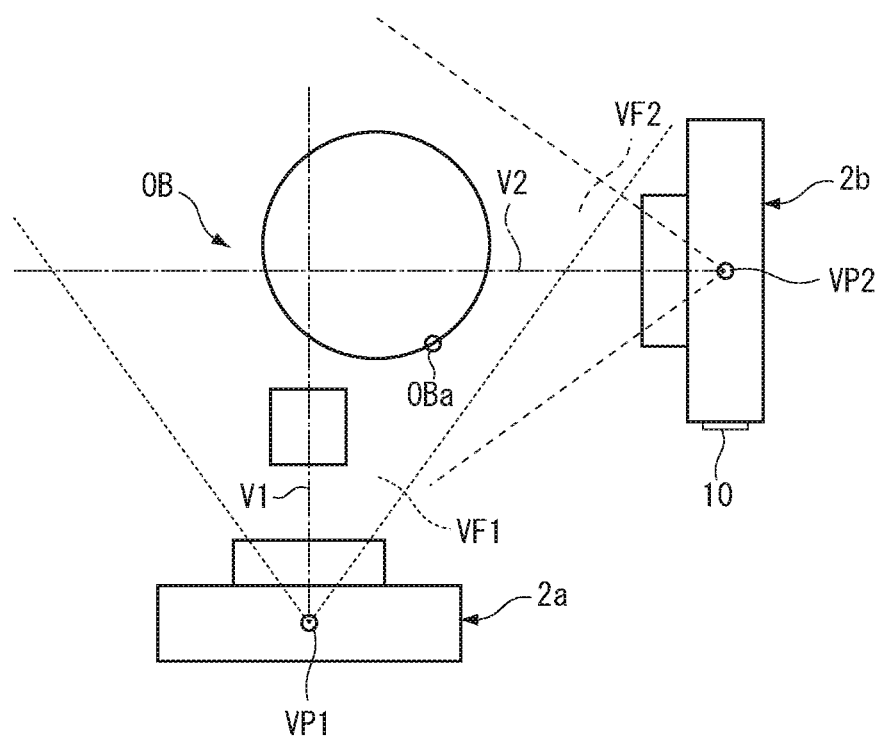
FIGS. 9A and 9B are each a diagram illustrating an imaging system according to a second embodiment.
Figure 9B:
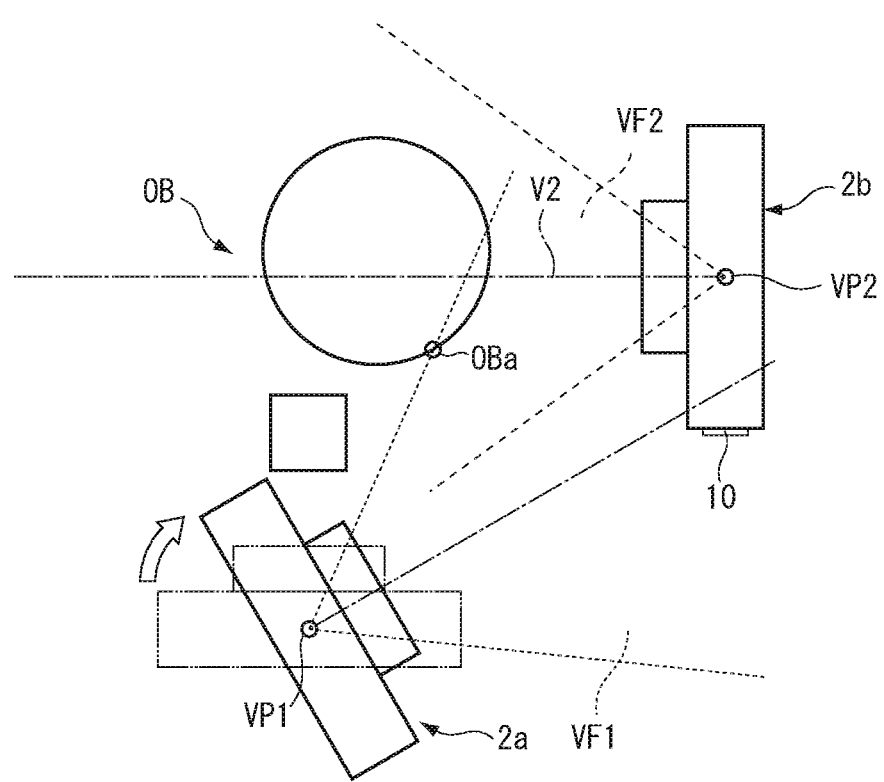

Next, a second embodiment is described. In the second embodiment, the same configurations as those in the above-mentioned embodiment are denoted by the same reference symbols and descriptions thereof are simplified or omitted. FIGS. 9A and 9B are each a diagram illustrating an imaging system according to a second embodiment.

In the above-mentioned embodiment, for example, as illustrated in FIGS. 2A and 2B, described is an example in which the second imaging device 2b is arranged within the field of view VF1 of the first imaging device 2a. As illustrated in FIG. 9A, when the object OB is detected by the first imaging device 2a, the second imaging device 2b (for example, the presenter 10) may be arranged outside the field of view VF1 of the first imaging device 2a.

As illustrated in FIG. 9B, for example, the first imaging device 2a is arranged such that the second imaging device 2b is within the field of view VF1 in a period during which the object OB is not detected. For example, when detecting the second imaging device 2b, the first imaging device 2a is arranged at a position rotated from when detecting the object OB. The imaging system 1 detects a movement amount (for example, a rotation angle) of the first imaging device 2a between the time of detecting the object OB by the first imaging device 2a (for example, FIG. 9A) and the time of detecting the second imaging device 2b by the first imaging device 2a (for example, FIG. 9B). The imaging system 1 uses this movement amount to acquire position information indicating the positional relation between the first imaging device 2a at the time of detecting the object OB and the second imaging device 2b at the time of detecting the object OB.

Figure 10:
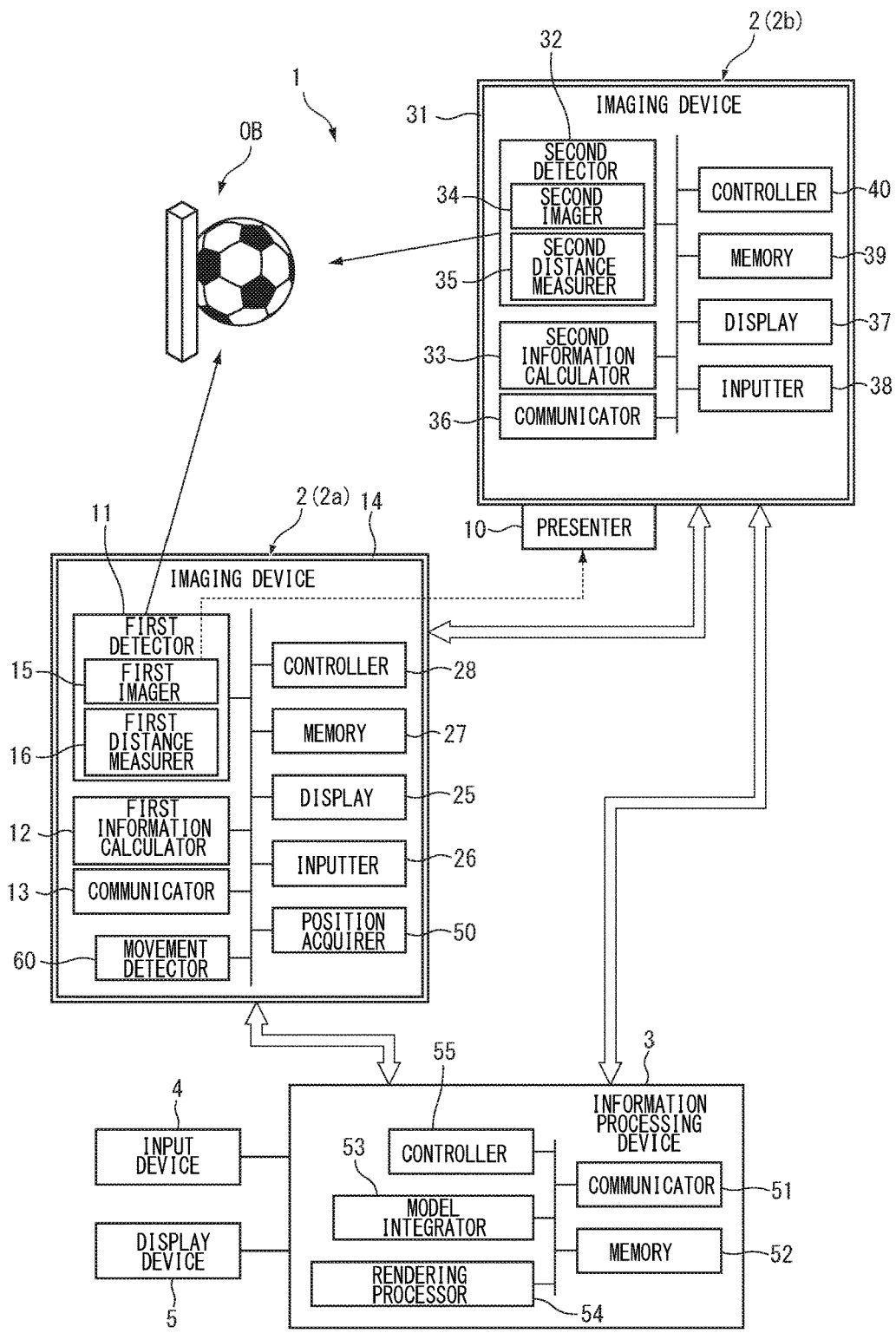
FIG. 10 is a block diagram illustrating the imaging system according to the second embodiment.

FIG. 10 is a block diagram illustrating the imaging system 1 according to the second embodiment. The imaging system 1 includes a movement detector 60 that detects a movement amount of the first body 14. For example, the movement detector 60 is provided in the first body 14. For example, the movement detector 60 includes an angular speed sensor and integrates the angular speed of the first body 14 in a period from the start of rotation of the first body 14 to the end of rotation thereof with respect to time to detect the rotation angle (the movement amount) of the first body 14.

The movement detector 60 may detect the rotation position of the first body 14 by a geomagnetic sensor or the like and calculate a difference in the rotation position before and after the rotation of the first body 14 to calculate the rotation angle of the first body 14. The first imaging device 2a may be moved manually by a user or, for example, supported by a moving body (for example, a rotator) and moved (rotated) along with the movement (rotation) of the moving body. In this case, the movement detector 60 may acquire rotation information from an encoder or the like that detects the movement of the moving body to detect the movement amount of the first imaging device 2a. The movement detector 60 may be provided in another device than the first imaging device 2a. For example, the movement detector 60 may detect the movement amount of the first imaging device 2a on the basis of an image obtained by imaging the first imaging device 2a by another imaging device than the first imaging device 2a.

The position acquirer 50 acquires the movement amount of the first imaging device 2a from the movement detector 60. When the first imaging device 2a detects the second imaging device 2b after detecting the object OB, the position acquirer 50 uses the detection result of the second imaging device 2b by the first imaging device 2a after movement to acquire position information indicating the positional relation between the first imaging device 2a and the second imaging device 2b after movement. The position acquirer 50 uses the position information and the movement amount of the first imaging device 2a to calculate position information indicating the positional relation between the first imaging device 2a and the second imaging device 2b before movement (the time of detecting the object OB).

When the first imaging device 2a detects the object OB after detecting the second imaging device 2b, the position acquirer 50 uses the detection result of the second imaging device 2b by the first imaging device 2a before movement to acquire the position information indicating the positional relation between the first imaging device 2a and the second imaging device 2b before movement. The position acquirer 50 uses the position information and the movement amount of the first imaging device 2a to calculate the position information indicating the positional relation between the first imaging device 2a and the second imaging device 2b after movement (the time of detecting the object OB).

Figure 11:
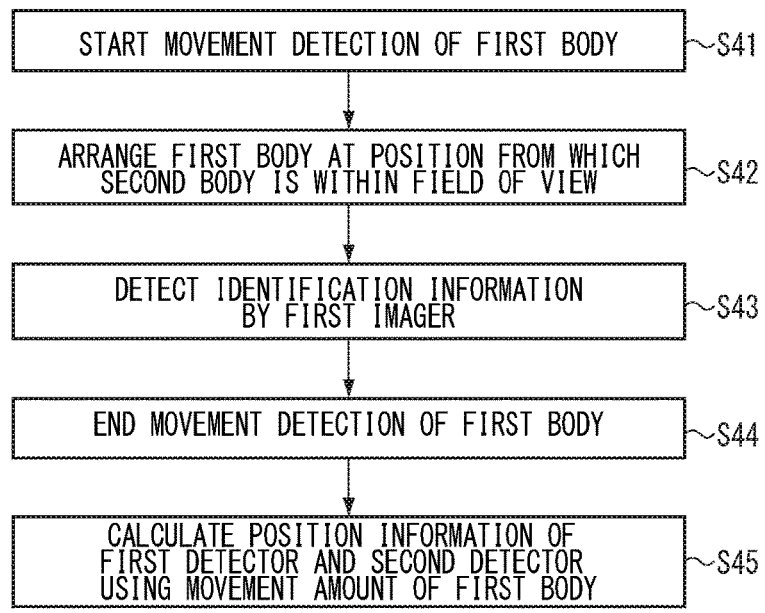
FIG. 11 is a flowchart illustrating an operation of the imaging system according to the second embodiment.

FIG. 11 is a flowchart illustrating an operation of the imaging system 1 according to the second embodiment. In Step S41, the movement detector 60 starts the detection of movement of the first imaging device 2a (the first body 14). In Step S42, the first body 14 is arranged such that the second body 31 is within the field of view of the first imaging device 2a, for example, manually by a user or by the moving body that moves the first imaging device 2a. In Step S43, the first detector 11 (for example, the first imager 15) detects identification information of the second body 31. In Step S44, the movement detector 60 ends the detection of movement of the first body 14. In Step S45, the position acquirer 50 uses the movement amount of the first body 14 to calculate the position information indicating the positional relation between the first detector 11 and the second detector 32.

Figure 12:
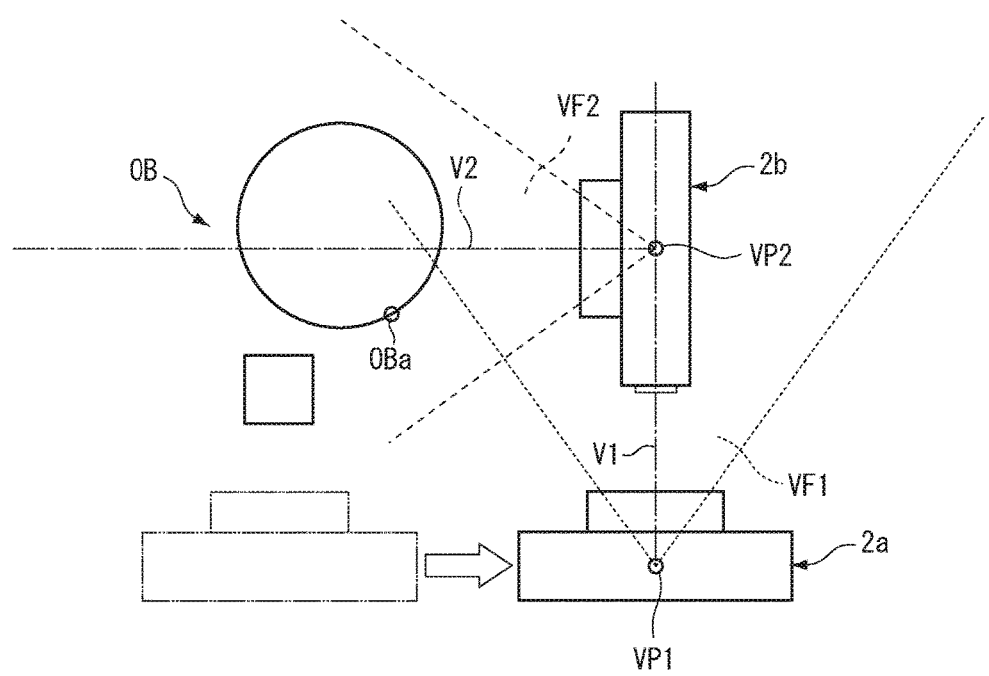
FIG. 12 is a diagram illustrating a modification according to the second embodiment.

FIG. 12 is a diagram illustrating a modification according to the second embodiment. FIG. 10 describes an example in which the first imaging device 2a is rotated; as illustrated in FIG. 12, the first imaging device 2a may be translated to arrange the first imaging device 2a at a position from which the second imaging device 2b is within its field of view. In this case, for example, the movement detector 60 includes an acceleration sensor, integrates the acceleration with respect to time in a period from the start of movement of the first imaging device 2a to the end of movement thereof to calculate speed, and integrates the speed with respect to time to calculate a change amount (a movement amount) of the position. When the first imaging device 2a is moved by the moving body that supports the first imaging device 2a, the movement detector 60 may use the detection result of the encoder that detects the position of the moving body to calculate the movement amount of the first imaging device 2a.

Even when the object OB and the second imaging device 2b are within the field of view of the first imaging device 2a, for example, when the identification information of the second imaging device 2b is difficult to be detected by the first imaging device 2a, the first imaging device 2a may be moved to detect the identification information of the second imaging device 2b. The movement detector 60 may detect a rotation amount and a translation amount of the first imaging device 2a, and the position acquirer 50 may use the rotation amount and the translation amount of the first imaging device 2a to acquire the position information. The second imaging device 2b may be moved to the field of view VF1 of the first imaging device 2a, and the first imaging device 2a may detect the identification information of the second imaging device 2b. In this case, a movement amount of the second imaging device 2b may be detected, and the position acquirer 50 may use the detection result to acquire the position information.

Third Embodiment

Figure 13:
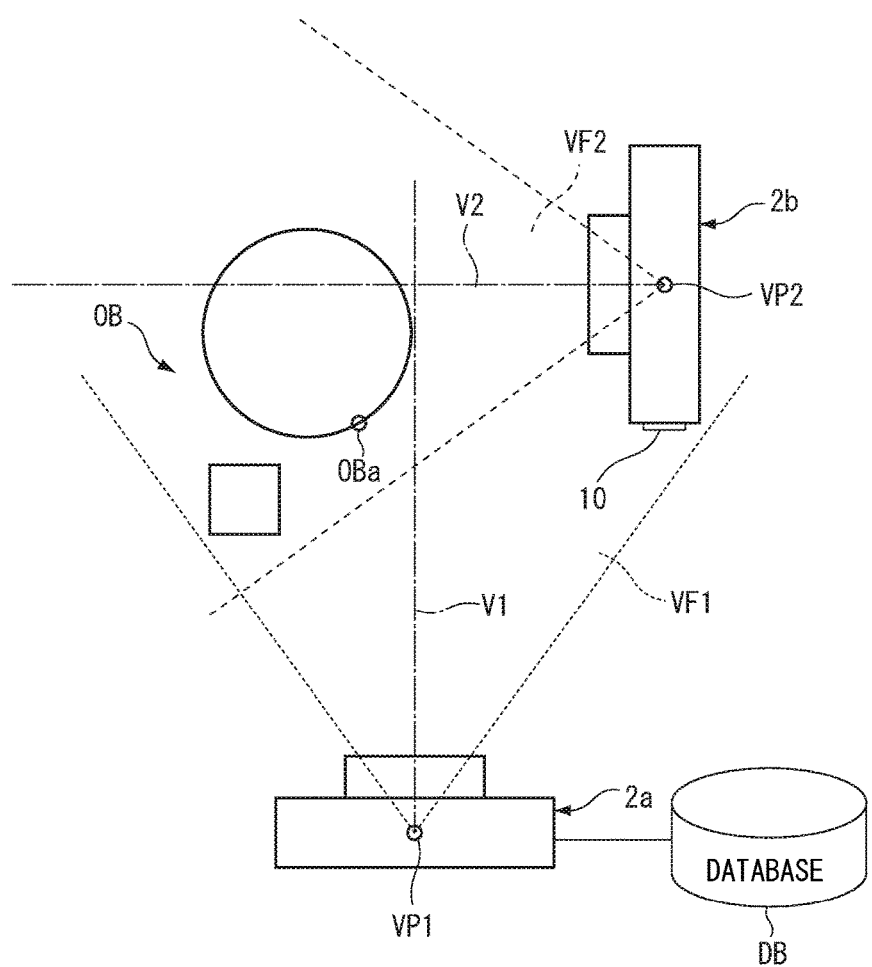
FIG. 13 is a diagram illustrating an imaging system according to a third embodiment.

Next, a third embodiment is described. In the third embodiment, the same configurations as those in the above-mentioned embodiments are denoted by the same reference symbols and descriptions thereof are simplified or omitted. FIG. 13 is a diagram illustrating the imaging system 1 according to the third embodiment.

The first imaging device 2a detects at least the individual identification information (for example, an ID) in the identification information of the second imaging device 2b. The first imaging device 2a uses the detected individual identification information to acquire information from a database DB (a memory) that holds the position of the second imaging device 2b and calculates the position information indicating the positional relation between the first imaging device 2a and the second imaging device 2b.

FIG. 14 is a diagram illustrating an example of a data structure of the database DB. For example, the database DB holds an ID associated with the identification information of a device of the imaging system 1, a name of the device with each ID, a position of the device with each ID, and an attitude of the device with each ID in association with each other. For example, a device with an ID of 1 is the first imaging device 2a; its position includes an X-coordinate of X1, a Y-coordinate of Y1, and a Z-coordinate of Z1; and its attitude includes a rotation angle about an X-axis of $\alpha1$, a rotation angle about a Y-axis of $\beta1$, and a rotation angle about a Z-axis of $\gamma1$. For example, the position and the attitude of the device with each ID are defined by using a coordinate system freely set in an installation space in which the imaging system 1 is installed.

To construct the database DB, for example, the first imaging device 2a is arranged at a freely selected position with a freely selected attitude, the position and the attitude of the first imaging device 2a are measured at least one of before detecting and after detecting the object OB, and the measured values are registered in a data table. For example, when a plurality of support members such as tripods are positioned in the installation space for the imaging system 1, and an imaging device is mounted on any of the support members to position this imaging device, the position of the imaging device is determined by the position of the support member. In this case, to construct the database DB, the positions of the respective support members and the ID of the imaging device mounted on each support member may be registered in the data table. In the installation space for the imaging system 1, when a mark or the like is provided at a position at which an imaging device is installed, the coordinates of the mark may be registered in the data table in place of the coordinates of the support member.

For example, the position acquirer 50 illustrated in FIG. 3 and the like detects the identification information (for example, the individual identification information) of the second imaging device 2b by the first imager 15 and uses this identification information to acquire the position of the second imaging device 2b from the database DB. For example, the position acquirer 50 uses the identification information of the first imaging device 2a stored in the memory 27 to acquire the position of the first imaging device 2a from the database DB. The position acquirer 50 uses the position of the first imaging device 2a and the position of the second imaging device 2b acquired from the database DB to calculate the position information indicating the positional relation between the first imaging device 2a and the second imaging device 2b.

For example, the database DB is stored in the memory 52 in the information processing device 3 illustrated in FIG. 3 and the like. The database DB may be stored in the memory 27 in the first imaging device 2a, stored in the memory 39 in the second imaging device 2b, or stored in a memory device outside the imaging system 1. For example, the database DB may hold a relative position of the first imaging device 2a and the second imaging device 2b. In this case, the first imaging device 2a may acquire a position relative to the second imaging device 2b from the database DB using the identification information after detecting the identification information of the second imaging device 2b.

In place of making the database DB comprehensively hold the information of a plurality of devices, for example, a part of the information illustrated in FIG. 14 may be stored in another memory. For example, the memory 27 in the first imaging device 2a may store therein the position of the first imaging device 2a, whereas the memory 39 in the second imaging device 2b may store therein the position of the second imaging device 2b. In this case, the first imaging device 2a may acquire the position of the second imaging device 2b through communication with the second imaging device 2b after detecting the second imaging device 2b to calculate the position information indicating the positional relation between the first imaging device 2a and the second imaging device 2b. When acquiring information on the position of the second imaging device 2b from the database DB or the like, the first imaging device 2a does not necessarily need to detect the position of the second imaging device 2b by the first detector 11.

Fourth Embodiment

Figure 15:
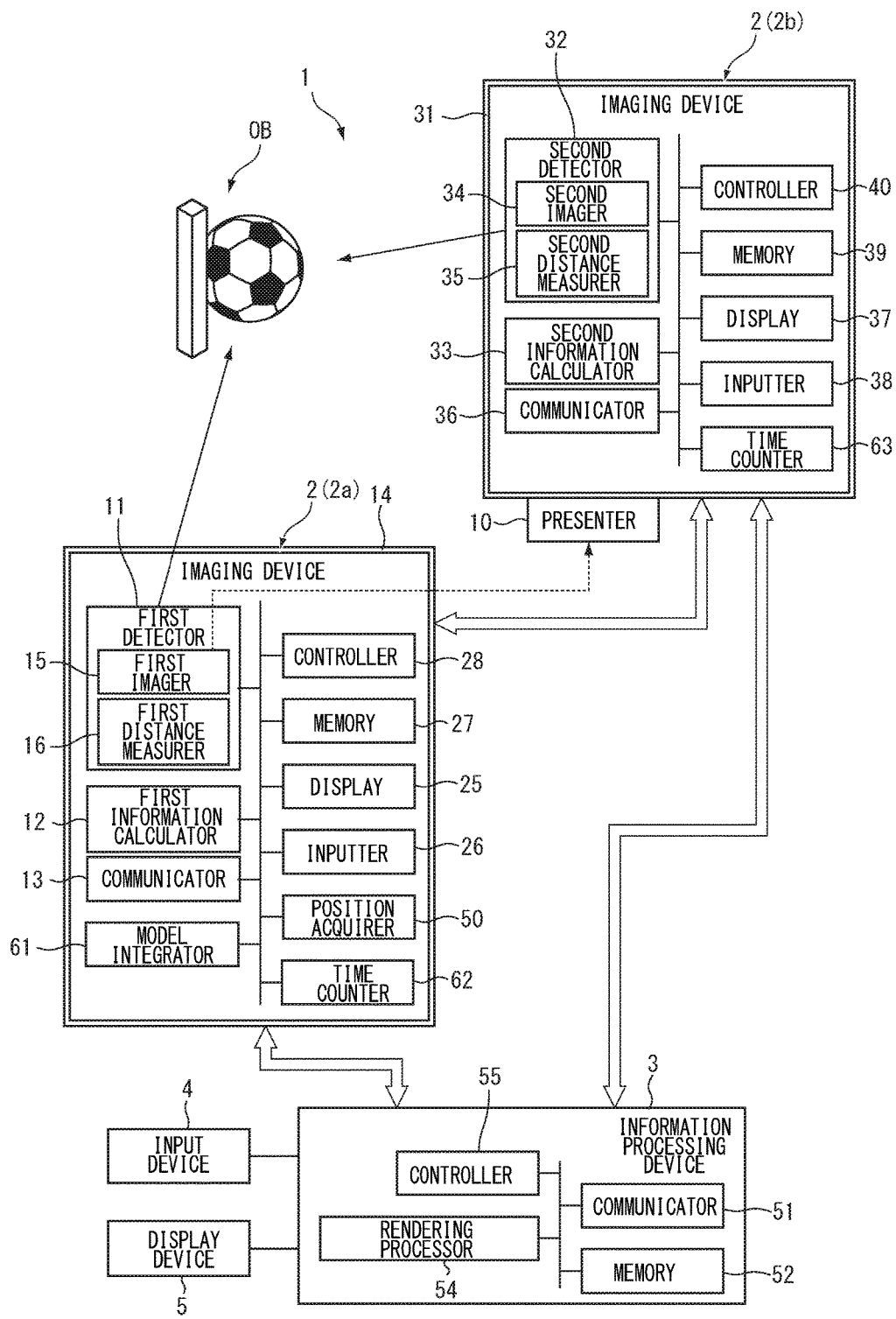
FIG. 15 is a diagram illustrating an imaging system according to a fourth embodiment.

Next, a fourth embodiment is described. In the fourth embodiment, the same configurations as those in the above-mentioned embodiments are denoted by the same reference symbols and descriptions thereof are simplified or omitted. FIG. 15 is a diagram illustrating the imaging system 1 according to the fourth embodiment.

In the fourth embodiment, the first imaging device 2a includes a model integrator 61. The first imaging device 2a detects the object OB and uses the detection result to calculate the first model information. The first imaging device 2a acquires the second model information calculated by the second imaging device 2b via communication with the second imaging device 2b. The model integrator 61 uses the first model information and the second model information to calculate the integrated model information. For example, an algorithm that the model integrator 61 uses for the integration of model information may be similar to that of the model integrator 53 in the information processing device 3 described in the first embodiment. For example, the first imaging device 2a supplies the calculated integrated model information to the information processing device 3. For example, the information processing device 3 uses the integrated model information to perform rendering processing.

In the fourth embodiment, the first imaging device 2a includes a time counter 62 that detects information on timing (hereinafter referred to as "timing information") at which the first detector 11 detects the object OB. For example, the timing information includes information indicating a period (for example, a date and time) during which the first detector 11 has performed detection processing. The timing information may include at least one of a start time and an end time of the period during which the first detector 11 has performed the detection processing. The second imaging device 2b includes a time counter 63 similar to the time counter 62.

For example, the timing information is used when model integration is performed by using a plurality of detection results that differ in the timing of detection of the object OB by the imaging device. For example, a plurality of pieces of model information may be calculated on the basis of at least two detection results of the object OB at relatively closer timings among the detection results, and the pieces of calculated model information may be integrated.

The timing information may include information on a period during which the first detector 11 is scheduled to detect the object OB. The first imaging device 2a and the second imaging device 2b may transmit and receive the timing information and detect the object OB in synchronization with each other by using the controller 28 and the communicator 13.

As described above, the information processing device 3 does not necessarily need to include the model integrator 53. The model integrator 53 may be included in at least one imaging device (for example, the first imaging device 2a) of the imaging devices 2 of the imaging system 1 and the information processing device 3. In this case, the model integration processing may be executed in a device in which load is relatively smaller in the imaging system 1. The imaging system 1 does not necessarily need to perform the model integration processing, and a device outside the imaging system 1 may perform the model integration processing. The imaging system 1 does not necessarily need to perform the rendering processing, and a device outside the imaging system 1 may perform the rendering processing. The imaging system 1 does not necessarily need to include the information processing device 3.

The technical scope of the present invention is not limited to the modes described in the above-mentioned embodiments and the like. For example, the controller in the imaging device reads an imaging program (a detection program and a control program) stored in the memory and executes the above-mentioned various kinds of processing in accordance with this imaging program. For example, this imaging program causes a computer to execute the above-mentioned various kinds of processing. The imaging program may be recorded in a computer-readable recording medium to be provided. At least one of the elements described in the above-mentioned embodiments and the like are sometimes omitted. The elements described in the above-mentioned embodiments and the like can be combined as appropriate. To the extent allowed by laws, the disclosure of all literature cited in the above-mentioned embodiments and the like is incorporated herein by reference.

DESCRIPTION OF REFERENCE SIGNS

1 Imaging system
2a First imaging device
2b Second imaging device
10 Presenter
11 First detector
12 First information calculator
14 First body
15 First imager
16 First distance measurer
31 Second body
32 Second detector
33 Second information calculator
34 Second imager
35 Second distance measurer
41 Identifier
50 Position acquirer
53 Model integrator
60 Movement detector
61 Model integrator
OB Object

What is claimed is:
1. An imaging system, comprising:
a first body;
a first detector that is provided in the first body and includes a first imager that images an object;
a first controller that is provided in the first body and is configured to use a detection result of the first detector to calculate at least one of shape information and texture information of the object;

a second body that is arranged at a position separate from the first body and has identification information detected by the first imager; and a second detector that is provided in the second body and includes a second imager that images the object, wherein the first controller is configured to acquire position information including a positional relation between the first detector and the second detector based on the identification information detected by the first imager.

2. The imaging system according to claim 1, comprising:

a second controller that is provided in the second body and is configured to use a detection result of the second detector to calculate at least one of shape information and texture information of the object, wherein one of (i) the first controller, (ii) the second controller, and (iii) a third controller is configured to integrate first model information including at least one of the shape information and the texture information calculated by the first controller and second model information including at least one of the shape information and the texture information calculated by the second controller by using the position information.

3. The imaging system according to claim 1, comprising a first distance measurer that is provided in the first body and detects a distance, the first distance measurer comprising an irradiator.

4. The imaging system according to claim 3, wherein the first controller is configured to calculate the position information by using the distance from the first distance measurer to the object detected by the first distance measurer and a distance from the first distance measurer to the second body detected by the first distance measurer.

5. The imaging system according to claim 1, wherein the first controller is configured to calculate the position information by using a distance from a first distance measurer to the object detected by the first distance measurer and the identification information, the first distance measurer comprising an irradiator.

6. The imaging system according to claim 1, comprising an acceleration sensor that is configured to detect a movement amount of the first body from time of detecting the object by the first detector to time of detecting the second body by the first detector, wherein the first controller is configured to use a detection result of the acceleration sensor to calculate the position information.

7. The imaging system according to claim 6, wherein the acceleration sensor is provided in the first body.

8. The imaging system according to claim 1, wherein the identification information includes a side face of the second body, and the first controller is configured to acquire the position information based on a specific part on the side face of the second body.

9. The imaging system according to claim 1, comprising a support member on which the second body is mounted, wherein the first controller is configured to identify a position at which the support member is arranged based on the identification information to acquire the position information based on the identified position.

10. The imaging system according to claim 1, comprising a presenter that is provided in the second body and presents an identifier including the identification information, the presenter comprising at least one of (i) a sticker, (ii) a chip, and (iii) a light.

11. The imaging system according to claim 10, wherein the first controller is configured to compare the identifier detected by the first imager and information on the identifier stored in advance to calculate an attitude of the identifier.

12. The imaging system according to claim 10, wherein the identifier emits light with a light intensity changing in accordance with an angle relative to a certain direction set relative to the second body, and the first controller is configured to use a result obtained by detecting light from the identifier by the first detector to calculate an angle between a direction connecting the first detector and the identifier and the certain direction.

13. The imaging system according to claim 1, wherein the first controller is configured to acquire, from a memory that stores therein a set value of a position of the second body, the set value by using the identification information detected by the first imager.

14. The imaging system according to claim 10, wherein the presenter presents the identification information with a pattern that temporally changes.

15. An imaging system comprising:

a first body;

a first imager that is provided in the first body and images an object;

a first controller that is provided in the first body and is configured to use an imaging result of the first imager to calculate at least one of shape information and texture information of the object;

a second body that is arranged within a field of view of the first imager and has a side face to be imaged by the first imager; and a second imager that is provided in the second body and images the object, wherein the first controller is configured to acquire position information including a positional relation between the first imager and the second imager based on a specific part on the side face imaged by the first imager.

16. The imaging system according to claim 15, comprising a communicator that is configured to transmit at least a part of model information of the object to an information processing device, the communicator comprising at least one of (i) an I/O port and (ii) a wireless communication device that performs wireless communication by radio waves or infrared rays.

17. An imaging device comprising:

a first body;

a first detector that is provided in the first body and includes a first imager that images an object; and a first controller that is provided in the first body and is configured to use a detection result of the first detector to calculate at least one of shape information and texture information of the object, wherein the first controller is configured to use a result obtained by detecting identification information of a second body arranged at a position separate from the first body by the first imager to acquire position information including a positional relation between the first detector and the second body.

18. The imaging device according to claim 17, wherein the first controller is configured to perform image recognition by using an image of the identification information imaged by the first imager to acquire the position information.

19. The imaging device according to claim 17, wherein the first imager images the identification information provided on a surface of the second body.

20. The imaging device according to claim 17, wherein at least one of (i) the first controller, (ii) a second controller that is provided in the second body, and (iii) a third controller is configured to integrate model information including at least one of the shape information and the texture information and second model information including at least one of shape information and texture information obtained by imaging the object in the second body by using the position information.

21. The imaging device according to claim 20, comprising a communicator that is configured to transmit integrated model information that is generated based on a certain data format and is integrated by the at least one of (i) the first controller, (ii) the second controller, and (iii) the third controller, the communicator comprising at least one of (i) an I/O port and (ii) a wireless communication device that performs wireless communication by radio waves or infrared rays.

22. The imaging device according to claim 20, wherein the model information includes header information.

23. A method of imaging comprising:
   imaging an object by a first imager provided in a first body;
   calculating, by using a detection result of a first detector including the first imager, at least one of shape information and texture information of the object;
   imaging the object by a second imager provided in a second body arranged at a position separate from the first body;
   detecting identification information of the second body using the first imager; and
   acquiring position information including a positional relation between a second detector including the second imager and the first detector based on the identification information detected by the first imager.

24. A non-transitory computer-readable storage medium storing therein a computer program that causes a computer to execute:
   imaging an object by a first detector that is provided in a first body and includes a first imager;
   calculating, by using a detection result of the first detector, at least one of shape information and texture information of the object; and
   acquiring, by using a result obtained by detecting identification information of a second body arranged at a position separate from the first body by the first imager, position information including a positional relation between the first detector and the second body.

25. A non-transitory computer storage medium storing therein a computer-readable program that causes a computer to execute:
   imaging an object by a first imager provided in a first body;
   calculating, by using an imaging result of the first imager, at least one of shape information and texture information of the object;
   imaging the object by a second imager that is arranged within a field of view of the first imager and is provided in a second body having a side face to be imaged by the first imager; and
   acquiring position information including a positional relation between the first imager and the second imager based on a specific part on the side face imaged by the first imager.

* * * * *